United States Patent
Iizuka

(10) Patent No.: US 9,071,354 B2
(45) Date of Patent: Jun. 30, 2015

(54) OPTICAL RECEIVING APPARATUS AND CHARACTERISTIC COMPENSATION METHOD

(71) Applicant: FUJITSU LIMITED, Kawasaki-shi, Kanagawa (JP)

(72) Inventor: Hiroshi Iizuka, Kasawaki (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 13/920,382

(22) Filed: Jun. 18, 2013

(65) Prior Publication Data

US 2014/0023360 A1 Jan. 23, 2014

(30) Foreign Application Priority Data

Jul. 20, 2012 (JP) ................................ 2012-162114

(51) Int. Cl.

| H04B 10/06 | (2006.01) |
|---|---|
| H04B 10/2507 | (2013.01) |
| H04B 10/2513 | (2013.01) |
| H04B 10/61 | (2013.01) |

(52) U.S. Cl.
CPC ...... *H04B 10/2507* (2013.01); *H04B 10/25133* (2013.01); *H04B 10/6161* (2013.01)

(58) Field of Classification Search
CPC ........... H04B 10/6161; H04B 10/6162; H04B 10/6163

USPC ...................................... 398/25, 81, 136, 147
See application file for complete search history.

(56) References Cited

U.S. PATENT DOCUMENTS

| 2005/0244164 A1* | 11/2005 | Miyashita et al. ............ 398/147 |
| 2010/0316392 A1* | 12/2010 | Onaka ............................ 398/159 |
| 2011/0123191 A1* | 5/2011 | Murakami et al. ............. 398/29 |
| 2011/0236023 A1* | 9/2011 | Shukunami et al. ............ 398/81 |

FOREIGN PATENT DOCUMENTS

| JP | 2005-318474 | 11/2005 |
| JP | 2011-114402 | 6/2011 |

* cited by examiner

*Primary Examiner* — Dzung Tran
(74) *Attorney, Agent, or Firm* — Staas & Halsey LLP

(57) ABSTRACT

An optical receiving apparatus includes: a compensator configured to compensate an amount of change in a characteristic; a controller configured to obtain, based on a first amount of change in the characteristic with respect to a first optical signal with a first wavelength, the first wavelength, and a wavelength characteristic in the characteristic, a second amount of change in the characteristic made when a second optical signal with a second wavelength is propagated in an optical path, the second wavelength being different from the first wavelength, and obtain a compensation amount based on the second amount of change; and a first setting unit configured to set the compensation amount for the compensator so that the compensator compensates the amount of change in the characteristic.

14 Claims, 19 Drawing Sheets

OPTICAL RECEIVING APPARATUS AND CHARACTERISTIC COMPENSATION METHOD

CROSS-REFERENCE TO RELATED APPLICATION

This application is based upon and claims the benefit of priority of the prior Japanese Patent Application No. 2012-162114, filed on Jul. 20, 2012, the entire contents of which are incorporated herein by reference.

FIELD

The embodiments discussed herein are related to an optical receiving apparatus and a characteristic compensation method.

BACKGROUND

A dispersion compensation method has been used as a characteristic compensation method in an optical transmission system. For example, there is a method in which the controller calculates the compensation amount of each transmission section based on the actual dispersion amount measured by optical transmission apparatuses and the designed dispersion amount of each transmission section and each optical transmission apparatus compensates the dispersion amount based on the compensation amount reported from the controller. In addition, there is a method in which an optical signal is branched, the branched optical signals are dispersion-compensated, the direction in which the dispersion amount is increased or reduced is decided based on the direction in which the communication quality of one of the compensated optical signals is changed, and the compensation amount of the other optical signal is controlled based on the decision result.

Japanese Laid-open Patent Publication Nos. 2005-318474 and 2011-114402 are examples of related art.

SUMMARY

According to an aspect of the invention, an optical receiving apparatus includes: a compensator configured to compensate an amount of change in a characteristic; a controller configured to obtain, based on a first amount of change in the characteristic with respect to a first optical signal with a first wavelength, the first wavelength, and a wavelength characteristic in the characteristic, a second amount of change in the characteristic made when a second optical signal with a second wavelength is propagated in an optical path, the second wavelength being different from the first wavelength, and obtain a compensation amount based on the second amount of change; and a first setting unit configured to set the compensation amount for the compensator so that the compensator compensates the amount of change in the characteristic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In an optical receiving apparatus with a tunable dispersion compensator, an appropriate dispersion amount is found and the appropriate dispersion amount is set for the tunable dispersion compensator, so that the wavelength dispersion may be compensated. As the compensation amount of the tunable dispersion compensator is changed little by little in the operational dispersion compensation range of the optical transmission system, the number of occurrences of an error in the dispersion-compensated optical signal changes as depicted by a quadratic function that is convex downward. When the appropriate compensation amount is set for the tunable dispersion compensator, the number of occurrences of an error in the dispersion-compensated optical signal is minimized. Accordingly, it is possible to obtain the optimum point of the compensation amount at which the minimum number of occurrences of an error is given by changing the compensation amount of the tunable dispersion compensator little by little while monitoring the number of occurrences of an error.

For example, when the control range of dispersion compensation is assumed to be, for example, −500 ps/nm to +500 ps/nm, if the optimum point of the compensation amount is found in steps of, for example, 10 ps/nm, then 100 steps are desired. It may take, for example, approximately 100 milliseconds for each step until the compensation amount of the tunable dispersion compensator becomes the set value after the compensation amount is set for the tunable dispersion compensator. Accordingly, a find process with 100 steps takes approximately 10 seconds.

When the optimum point of the compensation amount of a compensator that compensates the amount of change in a characteristic is found using a conventional method described above, it may take much time until the optimum point of the compensation amount is found and the appropriate compensation amount is set for the compensator. Accordingly, it may take long time until a signal passes when the optical receiving apparatus starts operating. When switching between signal routes is performed using protection control such as optical uni-directional path switched ring (OUPSR), it may also take long time until completion of the switching.

The following describes embodiments that provide an optical receiving apparatus and a characteristic compensation method that may shorten the time until a compensation amount is set for the compensator.

Preferred embodiments of the optical receiving apparatus and characteristic compensation method are described with reference to the drawings.

First Embodiment

Example of an Optical Receiving Apparatus

Figure 1:
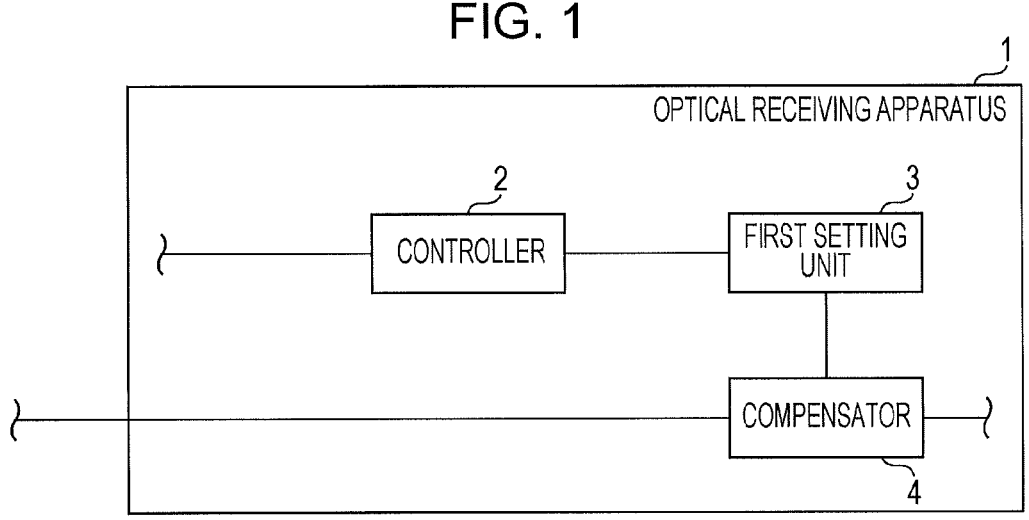
FIG. 1 depicts an example of an optical receiving apparatus according to an embodiment.
Figure 2:
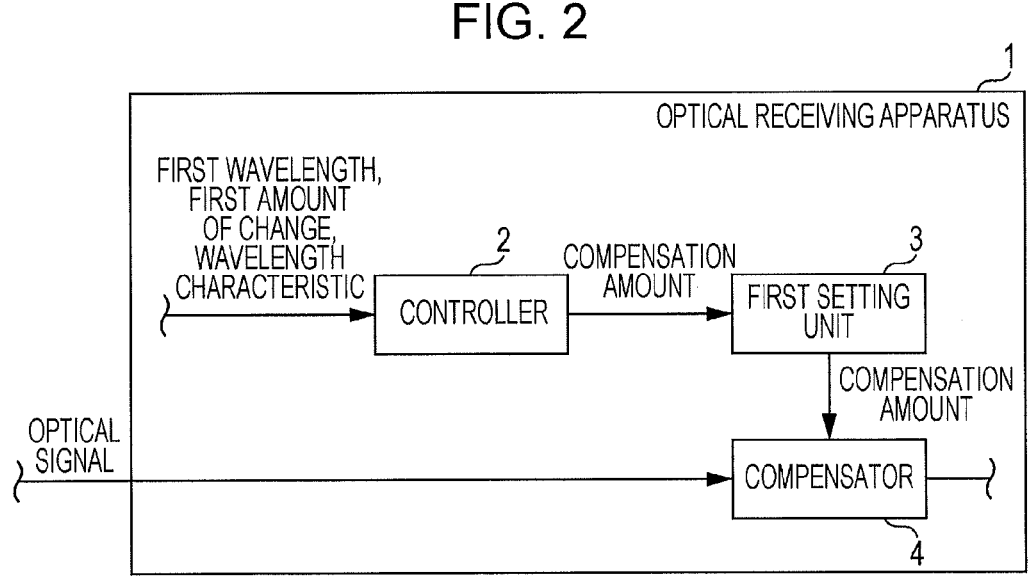
FIG. 2 depicts a signal flow in the optical receiving apparatus depicted in FIG. 1.

FIG. 1 depicts an example of an optical receiving apparatus according to an embodiment. FIG. 2 depicts a signal flow in the optical receiving apparatus depicted in FIG. 1. As depicted in FIGS. 1 and 2, the optical receiving apparatus 1 includes a controller 2, a first setting unit 3, and a compensator 4. The optical receiving apparatus 1 is connected to an optical transmission path (not depicted) such as an optical fiber. The optical receiving apparatus 1 receives an optical signal input from the optical transmission path.

The compensator 4 may be connected to, for example, the optical transmission path. The compensator 4 is connected to the first setting unit 3. The compensator 4 compensates the amount of change in a characteristic made when an optical signal input from, for example, the optical transmission path is received based on the compensation amount set by the first setting unit 3. When the optical signal passes through the compensator 4, the amount of change in the characteristic made when the optical signal propagates in the optical path is compensated. The compensated optical signal is output from the compensator 4. An example of change in the characteristic is, for example, the change in wavelength dispersion or polarization mode dispersion.

The controller 2 may receive information of a first amount of change in the characteristic with respect to an optical signal with a first wavelength, the first wavelength, and the wavelength characteristic of the amount of change in the characteristic from, for example, another circuit (not depicted) in the optical receiving apparatus 1. Alternatively, information of the first amount of change, the first wavelength, and the wavelength characteristic of the amount of change in the characteristic may be reported from an apparatus such as another optical receiving apparatus (not depicted) to the optical receiving apparatus 1.

The controller 2 obtains a second amount of change in the characteristic made when the optical receiving apparatus 1 receives an optical signal with a second wavelength, which is different from the first wavelength, based on the first amount of change, the first wavelength, and the wavelength characteristic of the amount of change. The controller 2 obtains the compensation amount based on the second amount of change.

The first setting unit 3 is connected to the controller 2. The first setting unit 3 sets the compensation amount for the compensator 4.

Example of a Characteristic Compensation Method

Figure 3:
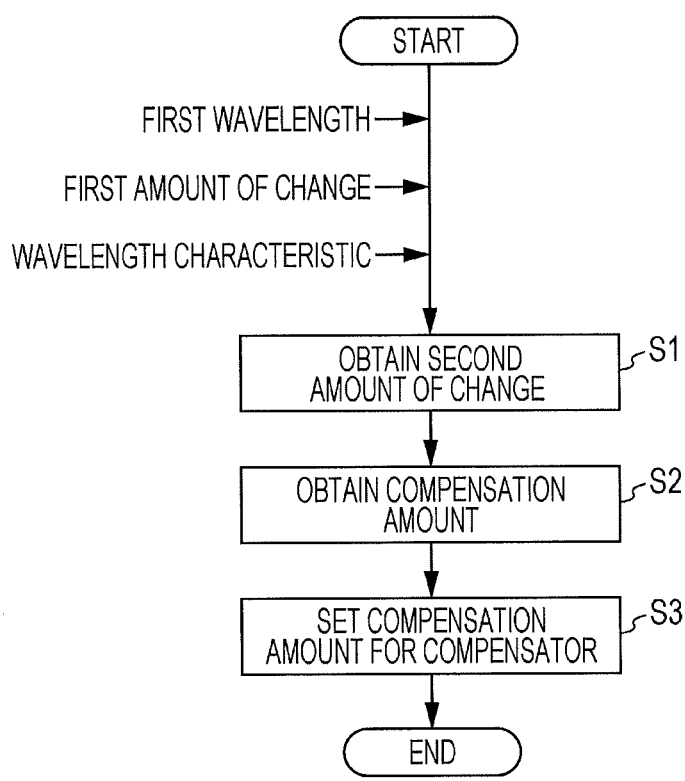
FIG. 3 depicts an example of a characteristic compensation method according to the embodiment.

FIG. 3 depicts an example of a characteristic compensation method according to the embodiment. The characteristic compensation method depicted in FIG. 3 may be performed by the optical receiving apparatus 1 depicted in FIG. 1. In the first embodiment, it is assumed that the characteristic compensation method is performed by the optical receiving apparatus 1 depicted in FIG. 1. This characteristic compensation method may be performed when the operation of the optical receiving apparatus 1 is started or switching between signal routes is performed by protection control. If the characteristic of the optical transmission path varies over time, this characteristic compensation method may be performed at all times.

As depicted in FIG. 3, when the characteristic compensation method is started in the optical receiving apparatus 1, the controller 2 receives information of the first amount of change in the characteristic with respect to the optical signal with the first wavelength, the first wavelength, and the wavelength characteristic of the amount of change in the characteristic from another circuit or an apparatus such as another optical receiving apparatus in the optical receiving apparatus 1. Then, the controller 2 obtains the second amount of change in the characteristic made when an optical signal with a second wavelength, which is different from the first wavelength, is received, based on the first wavelength, the first amount of change, and the wavelength characteristic (operation S1).

Next, the controller 2 obtains a compensation amount for compensating the second amount of change based on the second amount of change (operation S2) and outputs information of the compensation amount to the first setting unit 3. Next, the first setting unit 3 receives information of the compensation amount from the controller 2 and sets the compensation amount for the compensator 4 (operation S3). This ends the characteristic compensation method.

According to the optical receiving apparatus 1 depicted in FIG. 1 and the characteristic compensation method depicted FIG. 3, if the compensation amount generated when the optical signal with the second wavelength is received is obtained based on the first amount of change in the characteristic with respect to the optical signal with the first wavelength, a preferred compensation amount may be given in a shorter time than before. This reduces the time until the compensation amount is set for the compensator. This also reduces the time until a signal passes when an optical receiving apparatus starts operating or the time until switch between signal routes is completed by protection control.

Example of an Optical Transmission System

Figure 4:
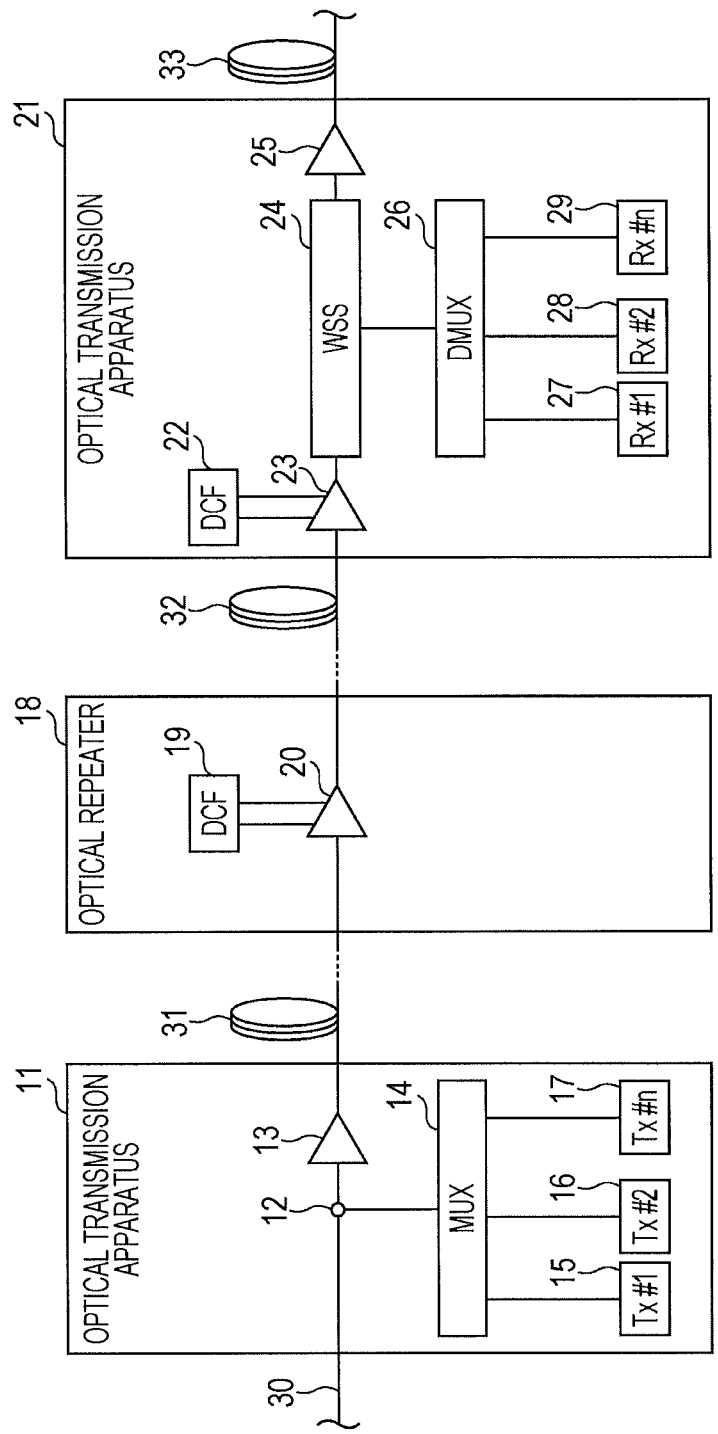
FIG. 4 depicts an example of an optical transmission system according to the embodiment.

FIG. 4 depicts an example of an optical transmission system according to the embodiment. As depicted in FIG. 4, the optical transmission system may include, for example, optical transmission apparatuses 11 and 21 and an optical repeater 18. For example, the optical transmission apparatuses 11 and 21 and the optical repeater 18 may be connected via optical transmission paths 30, 31, 32, and 33 such as optical fibers. The optical transmission apparatus 21 on the reception side is an example of the optical receiving apparatus according to the embodiment.

The optical transmission apparatus 11 on the transmission side includes one or more transmitters (abbreviated as Tx in FIG. 4) 15, 16, and 17. The transmitters 15, 16, and 17 may transmit optical signals having, for example, different wavelengths and the same communication system or optical signals having different wavelengths and different communication systems.

For example, a transmitter #1 15 may transmit a dual-polarization quadrature phase shift keying (DPQPSK) optical signal with a data transfer rate of 100 Gbps. For example, a transmitter #2 16 may transmit a differential quadrature phase shift keying (DQPSK) optical signal with a data transfer rate of 40 Gbps.

Optical signals transmitted from the transmitters 15, 16, and 17 are multiplexed by a multiplexer (MUX) 14, coupled to the optical signal transmitted from the optical transmission path 30 on the upstream side by a coupler 12, amplified by a post amplifier 13, and transmitted to the optical transmission path 31 on the downstream side. The optical transmission apparatus 11 on the transmission side may have a receiving unit (not depicted) that receives an optical signal transmitted from the upstream. The receiving unit may be configured like the optical transmission apparatus 21 on the reception side described later.

The optical repeater 18 compensates the wavelength dispersion of an optical signal that propagates in the optical transmission path 31 on the upstream side using, for example, a dispersion compensating fiber (DCF) 19, amplifies the optical signal using an amplifier 20, and transmits the amplified signal to optical transmission path 32 on the downstream side.

The optical transmission apparatus 21 on the reception side includes one or more receivers (abbreviated as Rx in FIG. 4) 27, 28, and 29. The receivers 27, 28, and 29 may receive optical signals having, for example, different wavelengths and the same communication system or optical signals having different wavelengths and different communication systems.

For example, a receiver #1 27 may receive a DPQPSK optical signal with a data transfer rate of 100 Gbps. For example, a receiver #2 28 may receive a DQPSK optical signal with a data transfer rate of 40 Gbps.

In the optical transmission apparatus 21 on the reception side, the optical signal transmitted from the optical transmission path 32 on the upstream side is compensated in its wavelength dispersion by, for example, a DCF 22 and amplified by a pre-amplifier 23. Of optical signals output from the pre-amplifier 23, the optical signals received by the receivers 27, 28, and 29 are selected by a wavelength selective switch (WSS) 24 and wavelength separation is performed by a demultiplexer (DMUX) 26, and separated optical signals are received by the receivers 27, 28, and 29.

On the other hand, the optical signals that pass through the wavelength selective switch 24 are amplified by a post-amplifier 25 and transmitted to the optical transmission path 33 on the downstream side. As is not depicted, the optical transmission apparatus 21 on the reception side may have a transmission unit that transmits optical signals to the downstream side. The structure of the transmission unit may be the same as that of the optical transmission apparatus 11 on the transmission side described above.

Second Embodiment

Another Example of the Optical Receiving Apparatus

Figure 5:
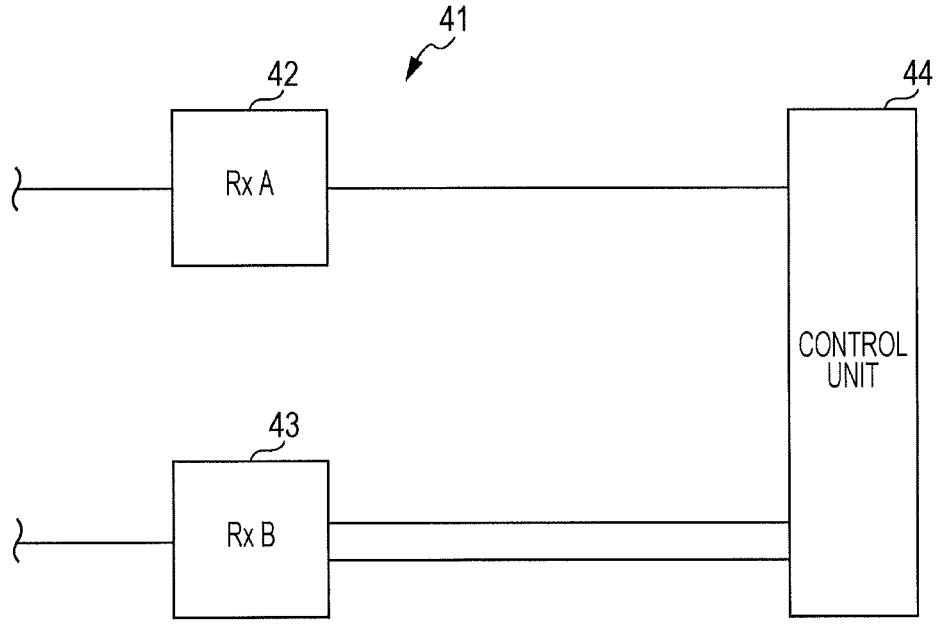
FIG. 5 depicts another example of an optical receiving apparatus according to an embodiment.
Figure 6:
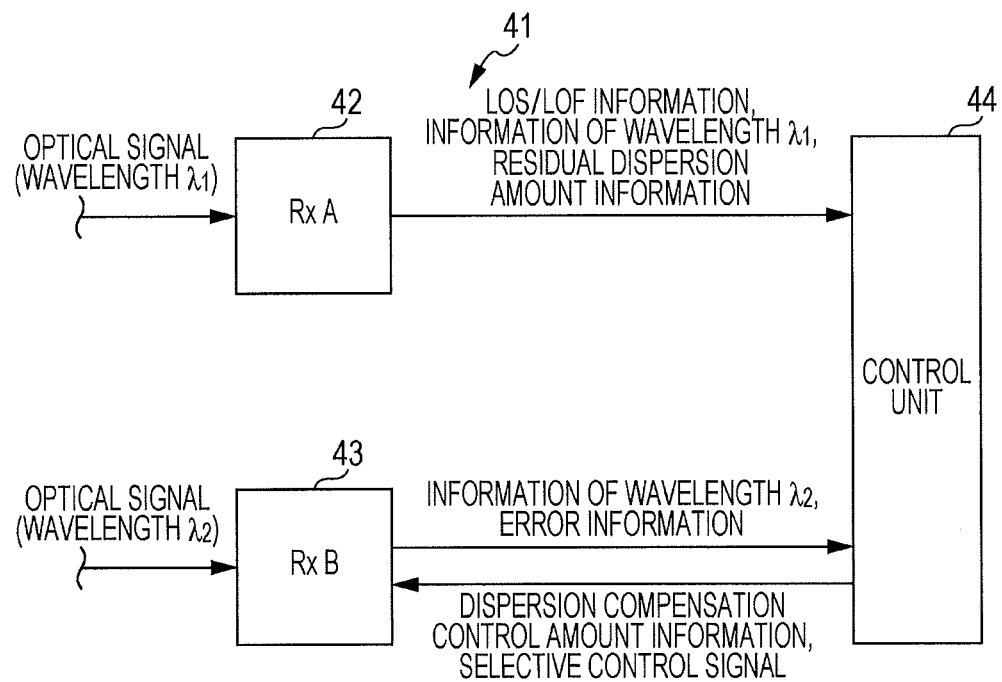
FIG. 6 depicts a signal flow in the optical receiving apparatus depicted in FIG. 5.

FIG. 5 depicts another example of an optical receiving apparatus according to an embodiment. FIG. 6 depicts a signal flow in the optical receiving apparatus depicted in FIG. 5. The optical receiving apparatus 41 depicted in FIG. 5 is an example of the optical transmission apparatus 21 on the reception side depicted in FIG. 4.

As depicted in FIGS. 5 and 6, the optical receiving apparatus 41 includes a receiver A 42, a receiver B 43, and a control unit 44. The receiver A 42 is an example of a receiver that outputs information of the amount in change in the characteristic made when an optical signal is received. The receiver A 42 and receiver B 43 may receive optical signals that propagate in a single transmission section. The control unit 44 is an example of a controller. The receiver A 42 and the receiver B 43 may be connected to, for example, the demultiplexer 26 (see FIG. 4). The receiver A 42, the receiver B 43, and the control unit 44 are mutually-independent cards and may be installed in the cabinet of the optical receiving apparatus 41 in a detachable manner.

The receiver A 42 outputs information of the amount of change in the characteristic made when an optical signal is received. The description in the second embodiment assumes that change in the characteristic made when an optical signal is received is, for example, wavelength dispersion. Accordingly, the receiver A 42 outputs information of a residual dispersion amount generated when receiving an optical signal with a wavelength of $\lambda_1$.

An example of the receiver that outputs information of a residual dispersion amount is, for example, a digital coherent receiver. A digital coherent receiver receives an optical signal, obtains the residual dispersion amount by digital signal processing of electric signals generated from the optical signal through photoelectric conversion, and compensates the residual dispersion amount. The description in the second embodiment assumes that the receiver A 42 is, for example, a digital coherent receiver.

The receiver A 42 also outputs information of the wavelength $\lambda_1$. In addition, the receiver A 42 outputs information (abbreviated as LOS/LOF information in FIG. 6) of both or either of loss of signal (LOS) and loss of frame (LOF) about the received signal. Hereinafter, information of both or either of loss of signals (LOS) and loss of frames (LOF) is represented as LOS/LOF information.

The receiver B 43 has a device that compensates change in the characteristic made when an optical signal is received. If the change in the characteristic is, for example, wavelength dispersion, the device that compensates the change in the characteristic may be, for example, a tunable dispersion compensator. The description in the second embodiment assumes that the receiver B 43 has a tunable dispersion compensator.

The compensation amount is set for the tunable dispersion compensator of the receiver B 43 based on dispersion compensation control amount information supplied by the control unit 44. Based on the compensation amount, the tunable dispersion compensator compensates the wavelength dispersion generated when the receiver B 43 receives an optical signal with the wavelength $\lambda_2$. Details are described below, but the receiver B 43 detects an error that occurs when receiving an optical signal with the wavelength $\lambda_2$ so as to set the compensation amount for the tunable dispersion compensator based on the detection result.

Based on a selective control signal supplied from the control unit 44, the receiver B 43 selects between setting the compensation amount based on dispersion compensation control amount information for the tunable dispersion compensator or setting the compensation amount based on error detection information. The receiver B 43 also outputs information of the wavelength $\lambda_2$. The receiver B 43 also outputs error information, which is the detection result of an error.

The control unit 44 is connected to the receiver A 42 and the receiver B 43. The control unit 44 receives LOS/LOF information, information of the wavelength $\lambda_1$, information of the residual dispersion amount from the receiver A 42. The control unit 44 receives information of the wavelength $\lambda_2$ and error information from the receiver B 43.

The control unit 44 obtains the residual dispersion amount for the optical signal with the wavelength $\lambda_2$ based on information of the wavelength $\lambda_1$, information of the wavelength $\lambda_2$, and information of the wavelength characteristic of wavelength dispersion. The control unit 44 generates dispersion compensation control amount information based on the residual dispersion amount for the optical signal with the wavelength $\lambda_2$ and supplies the dispersion compensation control amount information to the receiver B 43. The control unit 44 generates a selective control signal based on LOS/LOF information and supplies the selective control signal to the receiver B 43.

Figure 7:
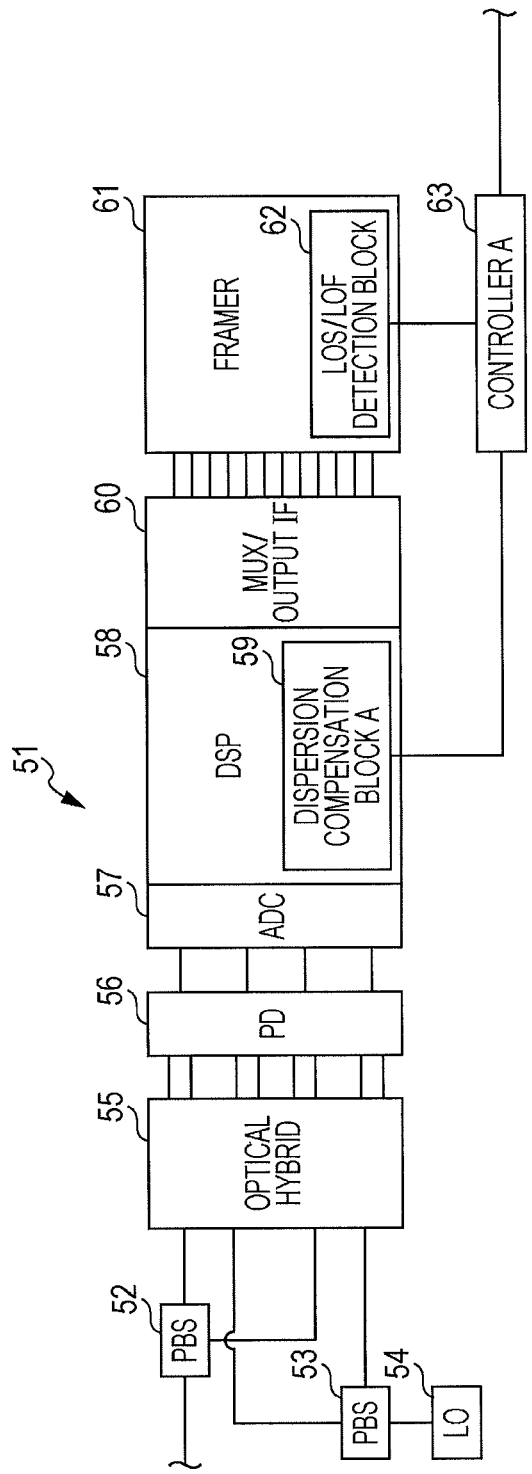
FIG. 7 depicts an example of a receiver A of the optical receiving apparatus depicted in FIG. 5.
Figure 8:
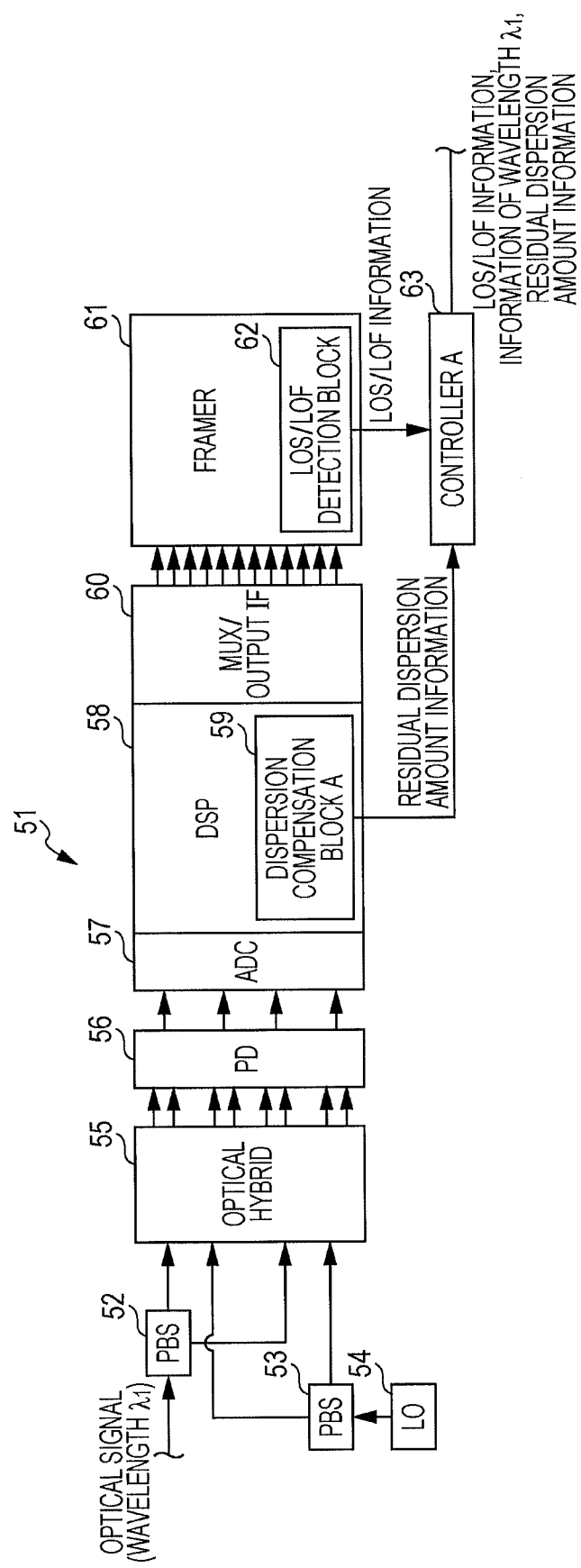
FIG. 8 depicts a signal flow in the receiver A depicted in FIG. 7.

Example of a Receiver that Outputs Information of the Amount of Change in the Characteristic FIG. 7 depicts an example of a receiver A of the optical receiving apparatus depicted in FIG. 5. FIG. 8 depicts a signal flow in the receiver A depicted in FIG. 7. As depicted in FIGS. 7 and 8, a digital coherent receiver 51, which is an example of the receiver A 42 (see FIG. 5), includes a polarization beam splitters (abbreviated as PBS in FIG. 7) 52 and 53, a local oscillator (abbreviated as LO in FIG. 7) 54, an optical hybrid 55, and photodiodes (abbreviated as PD in FIG. 7) 56.

The first polarization beam splitter 52 may be connected to, for example, the demultiplexer 26 (see FIG. 4). The first polarization beam splitter 52 splits the optical signal with the wavelength $\lambda_1$ into a vertically polarized wave and a horizontally polarized wave. The local oscillator 54 outputs local oscillator light. The second polarization beam splitter 53 is connected to the local oscillator 54. The second polarization beam splitter 53 splits the local oscillator light into a vertically polarized wave and a horizontally polarized wave.

The optical hybrid 55 is connected to the polarization beam splitters 52 and 53. The optical hybrid 55 mixes an optical signal including the polarized component output from the polarization beam splitter 52 with an optical signal including the polarized component output from the polarization beam splitter 53 and outputs an optical signal including quadrature components I and Q for each optical signal including the polarized component. The photodiodes 56 are connected to the optical hybrid 55. The photodiodes 56 photoelectrically convert the optical signals including quadrature components I and Q of the polarized component output from the optical hybrid 55 into analog electric signals.

The digital coherent receiver 51 includes an analog-digital converter (abbreviated as ADC in FIG. 7) 57, a digital signal processor (abbreviated as DSP in FIG. 7) 58, and a multiplexer/output interface (abbreviated as MUX/OUTPUT IF in FIG. 7) 60. The digital signal processor 58 includes a dispersion compensation block A 59.

The analog-to-digital converter 57 is connected to the photodiodes 56. The analog-to-digital converter 57 converts analog electric signals output from the photodiodes 56 into digital electric signals. The digital signal processor 58 is connected to the analog-to-digital converter 57. The digital signal processor 58 performs digital signal processing on a signal output from the analog-to-digital converter 57.

The digital signal processor 58 compensates characteristic variations such as wavelength dispersion in a received signal through digital signal processing. The dispersion compensation block A 59 obtains the residual dispersion amount in a received signal through digital signal processing and compensates the wavelength dispersion using the compensation amount of the wavelength dispersion corresponding to the residual dispersion amount. The dispersion compensation block A 59 outputs residual dispersion amount information. A technique for performing dispersion control and a technique for referencing residual dispersion amount information in the digital coherent receiver are well known.

The multiplexer/output interface 60 is connected to the digital signal processor 58. The multiplexer/output interface 60 converts an output signal from the digital signal processor 58 into a plurality of data signals and outputs them. The digital signal processor 58 may include the analog-to-digital converter 57 or may include the multiplexer/output interface 60.

The digital coherent receiver 51 includes a framer 61 and a controller A 63. The controller A 63 is an example of the first setting unit. The framer 61 includes a detection block (abbreviated as LOS/LOF detection block in FIG. 7) 62, which detects either or both of loss of signals and loss of frames. Hereinafter, the detection block, which detects either or both of loss of signals and loss of frames, is represented as the LOS/LOF detection block.

The framer 61 is connected to the multiplexer/output interface 60. The framer 61 maps the output signal from the multiplexer/output interface 60 to a predetermined data frame. The LOS/LOF detection block 62 detects whether loss of signals or loss of frames occurs when the framer 61 maps the signal to the data frame. The LOS/LOF detection block 62 outputs LOS/LOF information.

The controller A 63 is connected to the dispersion compensation block A 59 and the LOS/LOF detection block 62. The controller A 63 outputs LOS/LOF information, information of the wavelength $\lambda_1$, and residual dispersion amount information to the control unit 44 (see FIG. 6).

Figure 9:
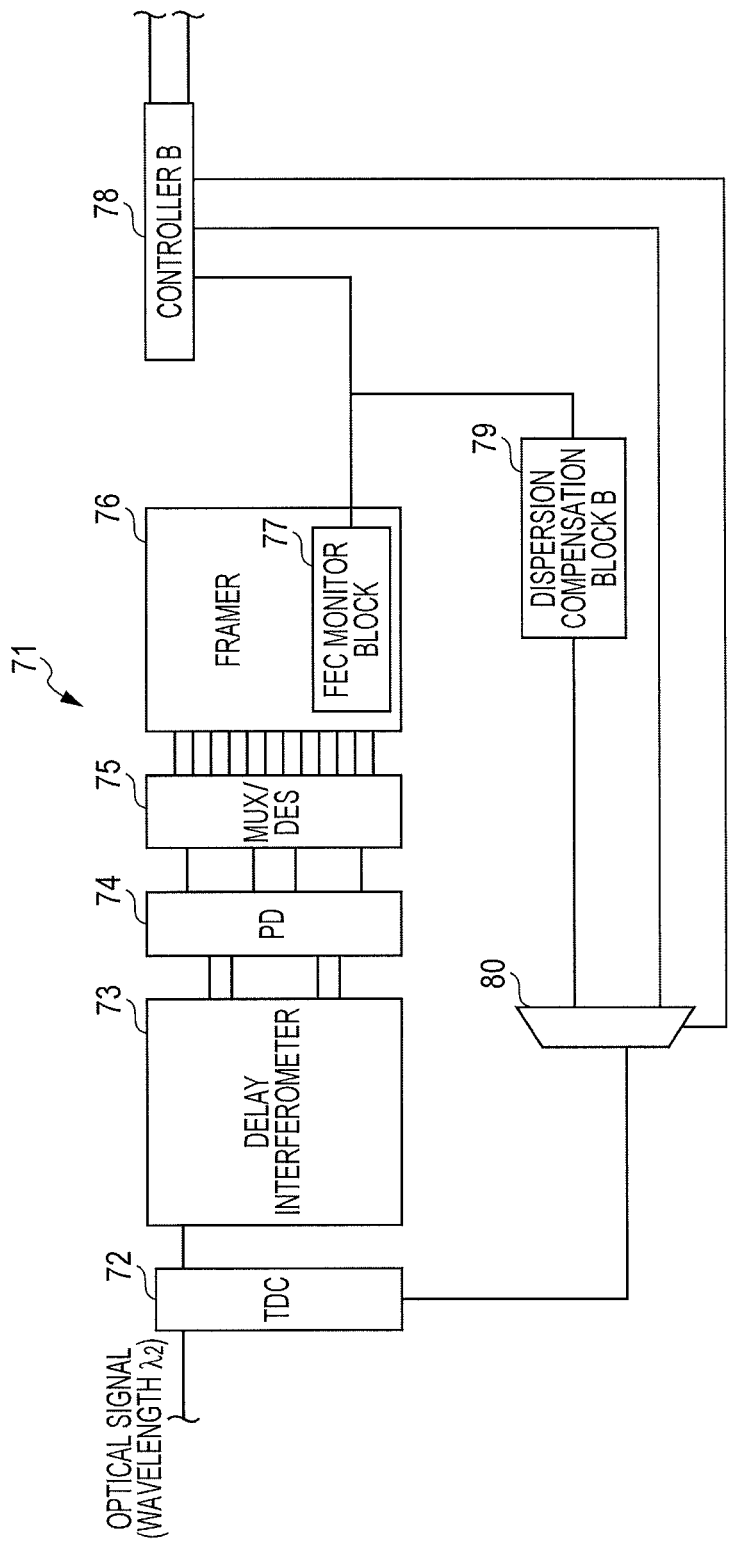
FIG. 9 depicts an example of a receiver B of the optical receiving apparatus depicted in FIG. 5.
Figure 10:
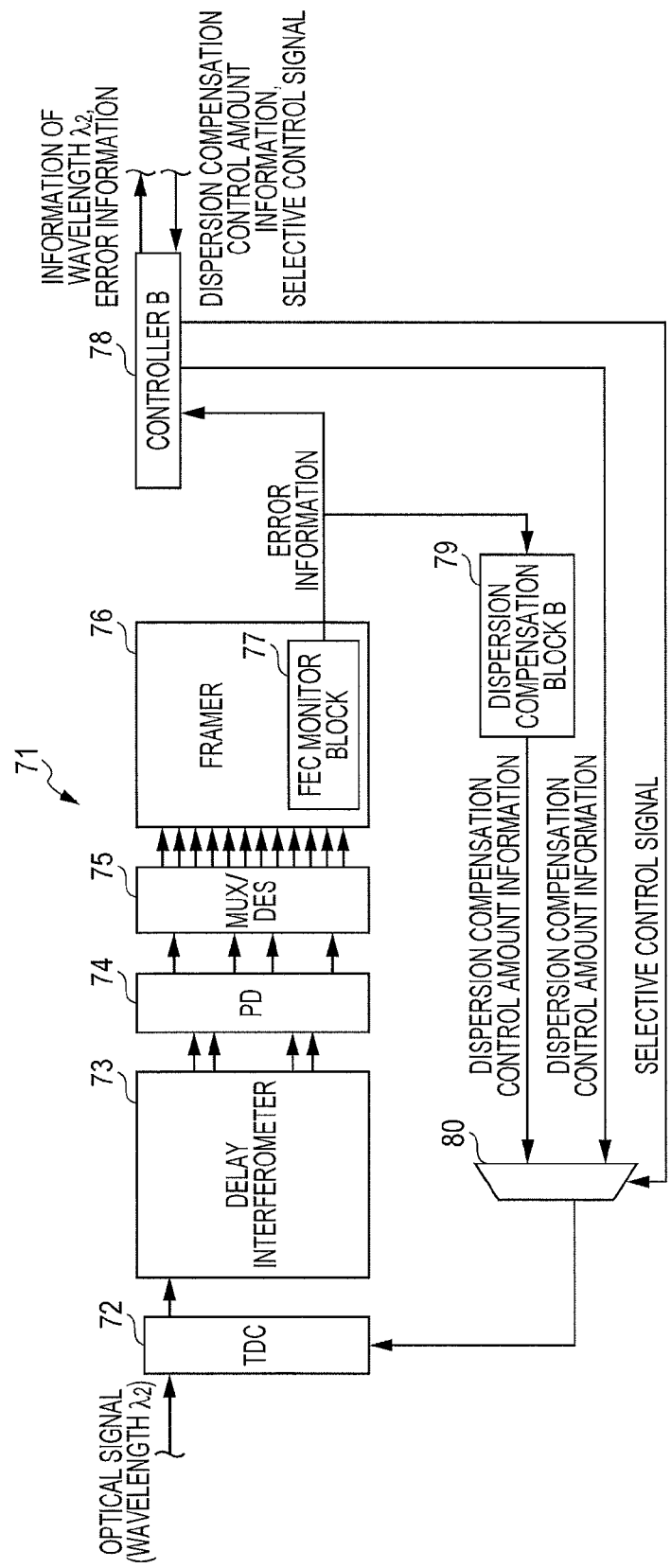
FIG. 10 depicts a signal flow in the receiver B depicted in FIG. 9.

Example of a Receiver that has a Device for Compensating Change in a Characteristic FIG. 9 depicts an example of a receiver B of the optical receiving apparatus depicted in FIG. 5. FIG. 10 depicts a signal flow in the receiver B depicted in FIG. 9. As depicted in FIGS. 9 and 10, a receiver 71, which is an example of the receiver B 43 (see FIG. 5), includes, for example, a tunable dispersion compensator (abbreviated as TDS in FIG. 9) 72. The tunable dispersion compensator 72 is an example of the compensator.

The tunable dispersion compensator 72 may be connected to, for example, the demultiplexer 26 (see FIG. 4). The tunable dispersion compensator 72 compensates the wavelength dispersion generated when the receiver 71 receives an optical signal with the wavelength $\lambda_2$ according to the compensation amount set based on the dispersion compensation control amount information output from the selector 80 described later.

The receiver 71 includes a delay interferometer 73 and photodiodes (abbreviated as PD in FIG. 9) 74. The delay interferometer 73 is connected to the tunable dispersion compensator 72. The delay interferometer 73 causes interference between the optical signal passing through the tunable dispersion compensator 72 and the delayed optical signal and outputs an optical signals including quadrature components I and Q. The photodiodes 74 are connected to the delay interferometer 73. The photodiodes 74 photoelectrically convert the optical signal including quadrature components I and Q output from the delay interferometer 73 into analog electric signals.

The receiver 71 includes a multiplexer/deserializer (abbreviated as MUX/DES in FIG. 9) 75, a framer 76, and a controller B 78. The framer 76 has a detection block that detects an error in a signal received by the receiver 71. This detection block may be a block that performs forward error correction (FEC). In the second embodiment, the detection block is assumed to be, for example, an FEC monitor block 77, which performs forward error correction. The FEC monitor block 77 is an example of the detector.

The multiplexer/deserializer 75 is connected to the photodiodes 74. The multiplexer/deserializer 75 converts a signal output from the photodiodes 74 into a plurality of data signals and outputs them.

The framer 76 is connected to the multiplexer/deserializer 75. The framer 76 maps the output signals from the multiplexer/deserializer 75 to a predetermined data frame. The FEC monitor block 77 detects an error and corrects the error when the framer 76 maps the signal to the data frame. The FEC monitor block 77 outputs error information indicating the number of errors.

The controller B 78 is connected to the FEC monitor block 77 and the control unit 44 (see FIG. 6). The controller B 78 receives error information from the FEC monitor block 77 and outputs the error information and information of the wavelength $\lambda_2$ to the control unit 44. The controller B 78 receives dispersion compensation control amount information output by the controller A 63 of the digital coherent receiver 51 and a selective control signal generated in the control unit 44 from the control unit 44 and outputs the dispersion compensation control amount information and the selective control signal to the selector 80 described later.

The receiver 71 includes a dispersion compensation block B 79 and the selector 80. The dispersion compensation block B 79 is an example of the second setting unit. The selector 80 is an example of the selector. The dispersion compensation block B 79 is connected to the FEC monitor block 77. The dispersion compensation block B 79 receives error information from the FEC monitor block 77 and generates dispersion compensation control amount information based on the error information using, for example, a conventional method such as a split-half method.

The selector 80 is connected to the controller B 78 and the dispersion compensation block B 79. The selector 80 selects either dispersion compensation control amount information supplied from the digital coherent receiver 51 via the control unit 44 or dispersion compensation control amount information output from the dispersion compensation block B 79, based on the selective control signal output from the controller B 78. The compensation amount is set for the tunable dispersion compensator 72 based on either the dispersion compensation control amount information supplied from the digital coherent receiver 51 or the dispersion compensation control amount information output from the dispersion compensation block B 79 that is selected by the selector 80.

Figure 11:
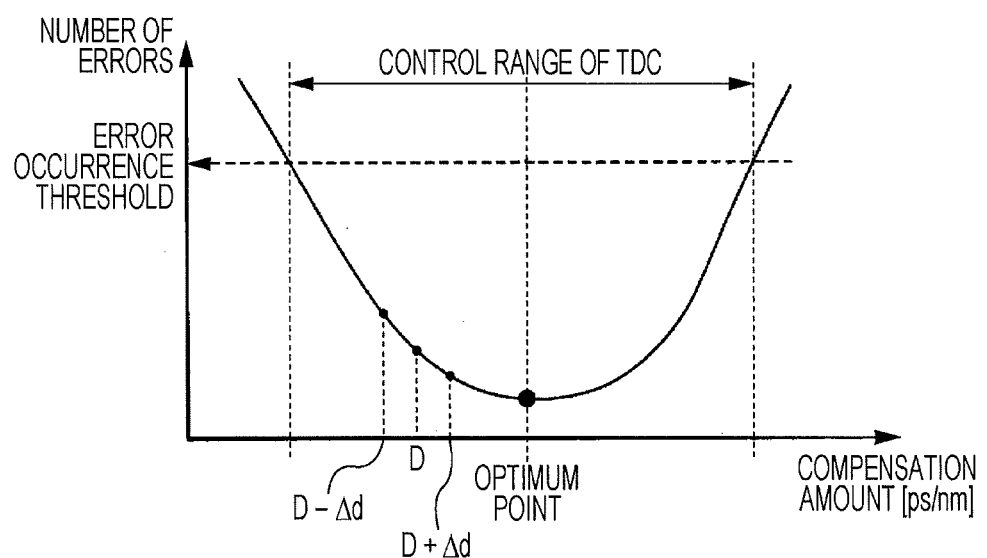
FIG. 11 depicts an example of the operation of a dispersion compensation block B of the receiver B depicted in FIG. 9.

FIG. 11 depicts an example of the operation of a dispersion compensation block B of the receiver B depicted in FIG. 9. As depicted in FIG. 11, the number of occurrences of an error in an optical signal passing through the tunable dispersion compensator changes as depicted by a quadratic function that is convex downward as the compensation amount of the tunable dispersion compensator changes little by little. The dispersion compensation block B 79 (see FIG. 9) sets the compensation amounts at three points (D, [D−Δd], and [D+Δd]) in the tunable dispersion compensator 72 (see FIG. 9) and monitors the number of occurrences of an error in the optical signal passing through the tunable dispersion compensator for each case. Then, the dispersion compensation block B 79 selects the compensation amount with the smallest number of errors from the compensation amounts at the three points (D, [D−Δd], or [D+Δd]).

The dispersion compensation block B 79 repeats this selection while changing D little by little with respect to the entire control range of the tunable dispersion compensator and obtains the optimum point of the compensation amount that gives the smallest number of occurrences of an error. The compensation amount information at the optimum point is the dispersion compensation control amount information output from the dispersion compensation block B 79. In the example depicted in FIG. 11, the control range of the tunable dispersion compensator is determined by, for example, an error occurrence threshold. The error occurrence threshold may be the maximum value of errors allowed for, for example, the number of redundant bits of forward error correction.

Example of the Control Unit

Figure 12:
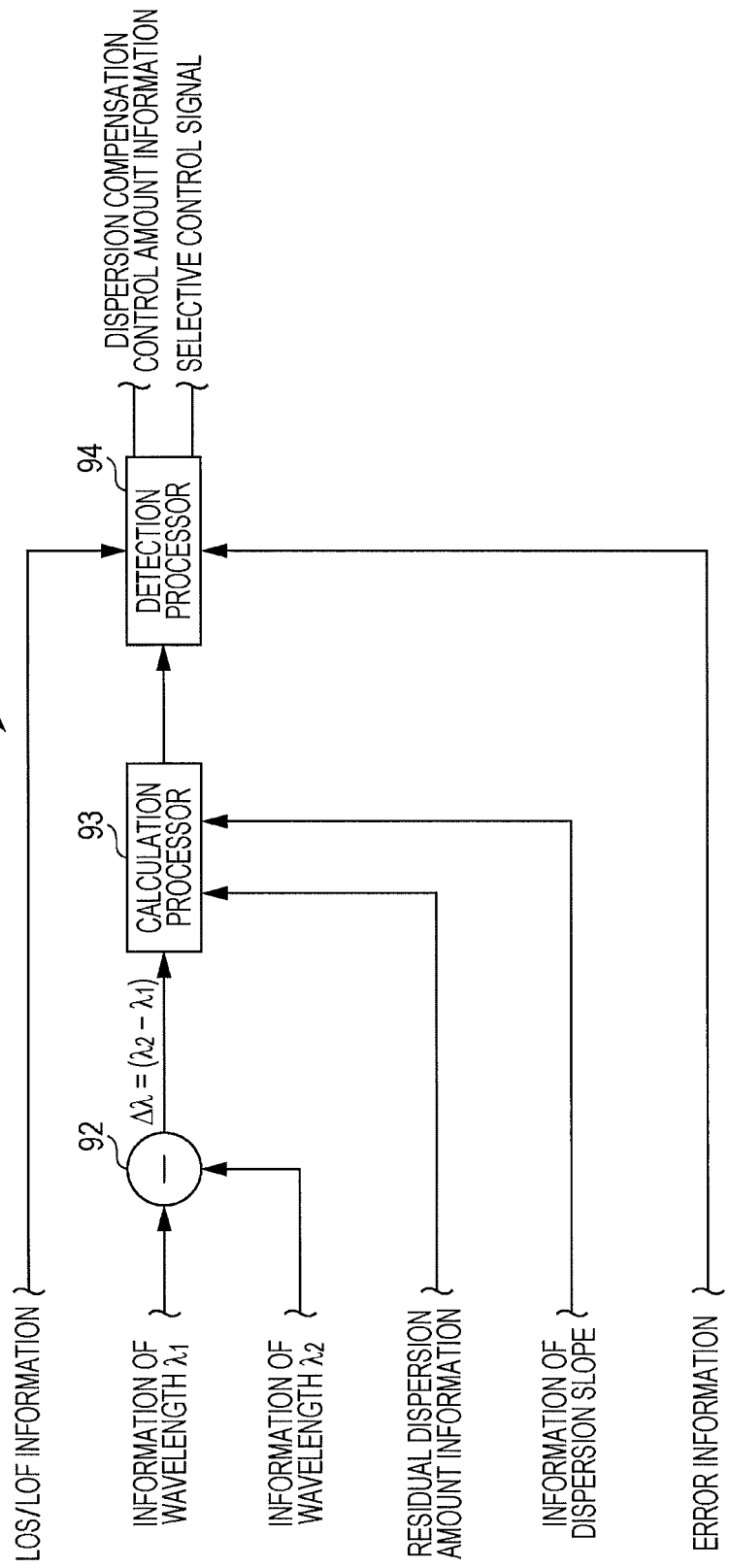
FIG. 12 depicts an example of a control unit of the optical receiving apparatus depicted in FIG. 5.

FIG. 12 depicts an example of a control unit of the optical receiving apparatus depicted in FIG. 5. As depicted in FIG. 12, a control unit 91 includes a subtractor 92, a calculation processor 93, and a detection processor 94. The subtractor 92, the calculation processor 93, and the detection processor 94 may be implemented by hardware or the processor may execute software that implements the subtractor 92, the calculation processor 93, and the detection processor 94.

The subtractor 92 is connected to, for example, the controller A 63 (see FIG. 7) of the digital coherent receiver 51 and the controller B 78 (see FIG. 9) of the receiver 71. For example, the subtractor 92 receives information of the wavelength $\lambda_1$ from the controller A 63 and information of the wavelength $\lambda_2$ from the controller B 78 and obtains $\Delta\lambda$ by subtracting $\lambda_1$ from $\lambda_2$ as depicted in equation (1) below.

$$\Delta\lambda = \lambda_2 - \lambda_1 \quad (1)$$

The calculation processor 93 is connected to the subtractor 92 and, for example, the controller A 63 (see FIG. 7). The calculation processor 93 receives information of $\Delta\lambda$ from the subtractor 92 and receives residual dispersion amount information from the controller A 63. For example, information of a dispersion slope $\alpha$ is input to the calculation processor 93 as an example of information of the wavelength information of wavelength dispersion. The dispersion slope $\alpha$ is an example of the wavelength characteristic in the characteristic. The calculation processor 93 obtains the dispersion compensation control amount as depicted in equation (2) based on information of $\Delta\lambda$, the residual dispersion amount, and the dispersion slope $\alpha$.

Figure 13:
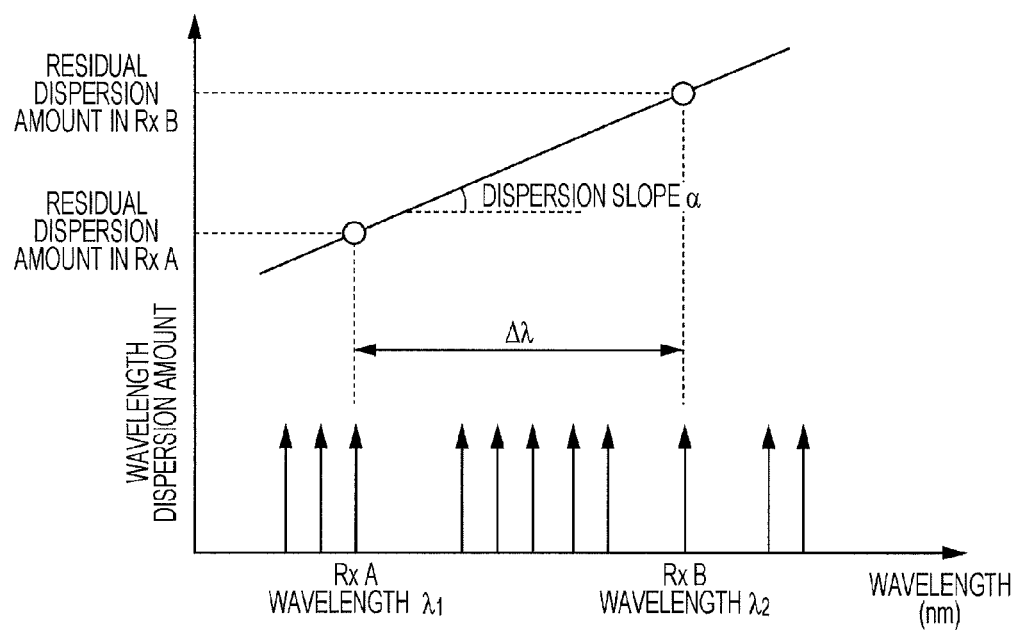
FIG. 13 depicts an example of the operation of the control unit depicted in FIG. 12.

FIG. 13 depicts an example of the operation of the control unit depicted in FIG. 12. As depicted in FIG. 13, if information of the wavelength $\lambda_1$ of an optical signal received by the receiver A, the residual dispersion amount when the receiver A receives the optical signal, and the wavelength $\lambda_2$ of an optical signal received by the receiver B is determined, then the residual dispersion amount when the receiver B receives the optical signal is determined from the dispersion slope $\alpha$. Accordingly, the dispersion compensation control amount appropriate for compensating the wavelength dispersion generated when the receiver B receives the optical signal is obtained by the calculation processor 93. In the example depicted in FIG. 13, the calculation processor 93 obtains the dispersion compensation control amount by calculating the equation (2) below.

[Dispersion compensation control amount for receiver $B$]=[Residual dispersion amount for receiver $A$]+$\alpha \times \Delta\lambda$ (2)

The dispersion slope $\alpha$ is a coefficient that depends on the transmission path characteristic and may be determined uniquely from the transmission path characteristic. Alternatively, the dispersion slope $\alpha$ may be determined in advance by detecting the optimum dispersion amount of several wave lengths during operation of the system. When the dispersion slope $\alpha$ is determined in advance by detecting the optimum dispersion amount of several wave lengths during operation of the system, the dispersion slope $\alpha$ may be determined by obtaining, for example, a plurality of pieces of residual dispersion amount information corresponding to different wavelengths from a plurality of receivers that output residual dispersion amount information as well as the receiver A. Information of the dispersion slope α may be given from, for example, a higher system. The value of the dispersion slope α may be stored in, for example, a memory (not depicted) in the control unit 44 (see FIG. 5).

Although the wavelength characteristic of the wavelength dispersion amount is linearly approximated in the example depicted in FIG. 13, but the wavelength characteristic may be approximated by a higher-degree function. In approximation by a higher-degree function, the coefficients of an approximate expression represented by a higher-degree function may be obtained in advance before starting the operation of the system.

As depicted in FIG. 12, the detection processor 94 is connected to the calculation processor 93, which is, for example, the controller A 63 (see FIG. 7) of the digital coherent receiver 51 or the controller B 78 (see FIG. 9) of the receiver 71. The detection processor 94 receives information of the dispersion compensation amount of the receiver B from the calculation processor 93. The detection processor 94 receives LOS/LOF information from, for example, the controller A 63 and error information from, for example, the controller B 78.

When, for example, LOS/LOF information is normal (that is, there is no loss of signals or no loss of frames in the LOS/LOF detection block 62 (see FIG. 7)), the detection processor 94 updates the value of dispersion compensation amount received from the calculation processor 93 and outputs the updated value. When LOS/LOF information is normal, the detection processor 94 outputs, to the selector 80, a selective control signal that causes the selector 80 (see FIG. 9) to select dispersion compensation control amount information output from the detection processor 94.

When loss of signals or loss of frames is detected in the LOS/LOF detection block 62 (see FIG. 7), the detection processor 94 stops the update of compensation control amount received from the calculation processor 93 and outputs a fixed value. When loss of signals or loss of frames is detected, the detection processor 94 outputs, to the selector 80, a selective control signal that causes the selector 80 (see FIG. 9) to select dispersion compensation control amount information output from the dispersion compensation block B 79 (see FIG. 9) of the receiver 71.

When error information degrades (that is, the number of errors increases) while the detection processor 94 updates and outputs the value of the dispersion compensation control amount received from the calculation processor 93, the detection processor 94 decides that the setting of the compensation amount of the tunable dispersion compensator 72 (see FIG. 9) is abnormal. When the detection processor 94 determines that the setting of the compensation amount of the tunable dispersion compensator 72 is abnormal, the detection processor 94 changes the value of the dispersion compensation control amount to be output back to the previous value. This sets the previous compensation amount for the tunable dispersion compensator 72. The previous value of the dispersion compensation control amount may be stored in, for example, a memory (not depicted) in the control unit 91.

Example of the Operation of the Control Unit

Figure 14:
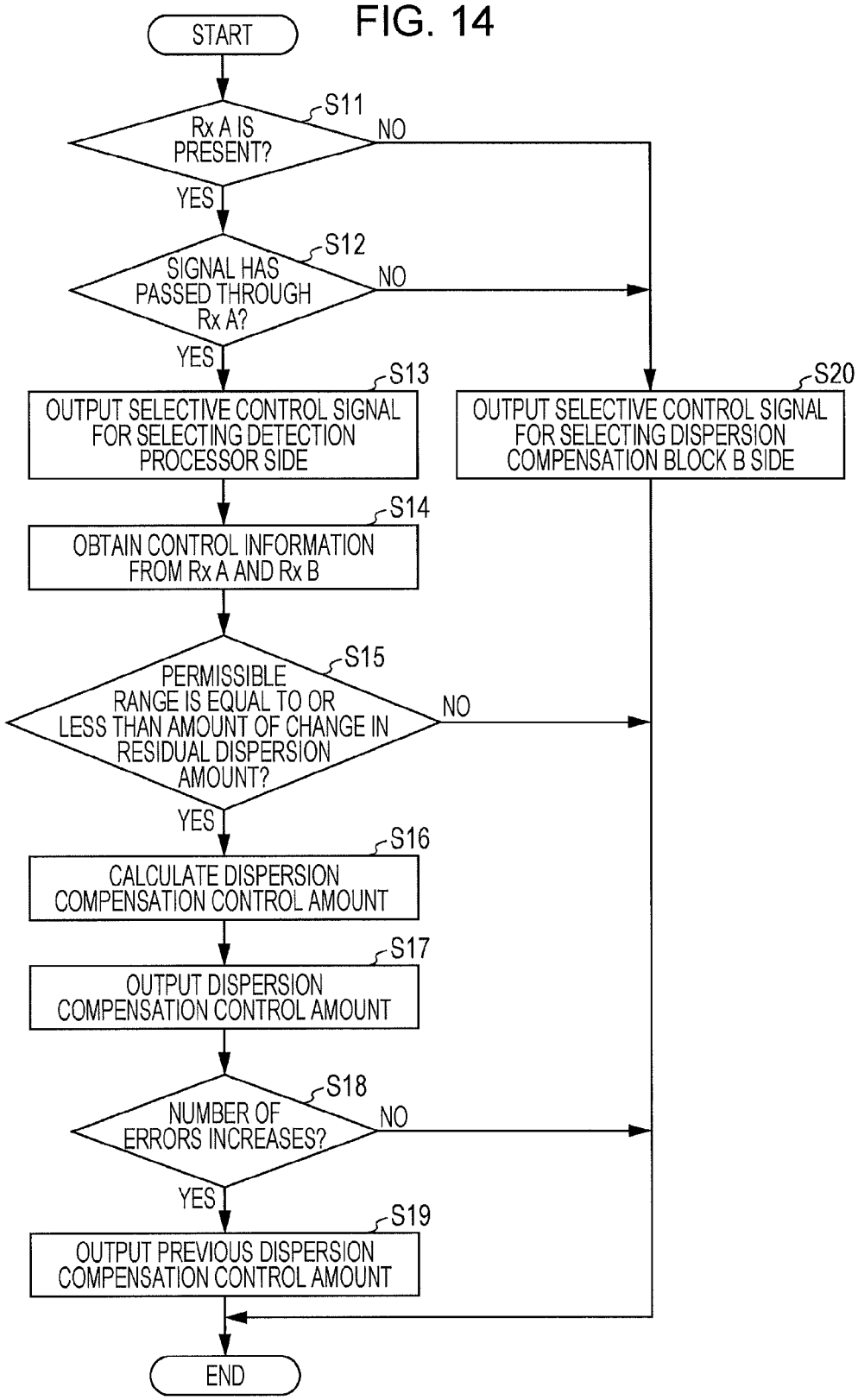
FIG. 14 is a flowchart depicting an example of the operation of the control unit depicted in FIG. 12.

FIG. 14 is a flowchart depicting an example of the operation of the control unit depicted in FIG. 12. As depicted in FIG. 14, when the control unit 91 starts operating, the control unit 91 first decides whether, for example, a receiver A like the digital coherent receiver 51 depicted in FIG. 7 is present in the optical receiving apparatus in which the control unit 91 is included (operation S11). When the receiver A is present (Yes in operation S11), the detection processor 94 decides whether a signal normally passes through the receiver A based on LOS/LOF information from the receiver A (operation S12). If a signal normally passes through the receiver A, no loss of signals or no loss of frames is detected, so LOS/LOF information is normal.

When the signal normally passes through the receiver A (Yes in operation S12), the detection processor 94 outputs a selective control signal that causes the selector 80 of a receiver B like, for example, the receiver 71 depicted in FIG. 9 to select the detection processor 94 side (operation S13). This switches the selector 80 of the receiver B so that the dispersion compensation control amount output by detection processor 94 is output to the tunable dispersion compensator 72 of the receiver B.

Next, the control unit 91 obtains control information from the receiver A and the receiver B (operation S14). For example, the control unit 91 obtains information of the wavelength $\lambda_1$, residual dispersion amount information, and LOS/LOF information from the receiver A. For example, the control unit 91 obtains information of the wavelength $\lambda_2$ and error information from the receiver B.

Next, the control unit 91 decides whether the change amount obtained by comparison between the value of the residual dispersion amount obtained from the receiver A and the previous value of the residual dispersion amount is equal to or more than a permissible range (operation S15). If the change amount is less than the permissible range (No in operation S15), the control unit 91 ends the operation without calculating the dispersion compensation control amount. In this case, the compensation amount set for the tunable dispersion compensator 72 of the receiver B remains at the previous value. On the other hand, if the change amount is equal to or more than the permissible range (Yes in operation S15), the calculation processor 93 calculates the dispersion compensation control amount based on difference $\Delta\lambda$ of the wavelength obtained by the subtractor 92, the dispersion slope α, and the residual dispersion amount (operation S16).

Next, the detection processor 94 receives information of the dispersion compensation control amount from the calculation processor 93 and outputs the information of the dispersion compensation control amount to the receiver B (operation S17). This causes the compensation amount derived from the residual dispersion amount of the receiver A to be set for the tunable dispersion compensator 72 of the receiver B and the wavelength dispersion generated when an optical signal with the wavelength $\lambda_2$ is received in the receiver B to be compensated.

Next, the detection processor 94 decides whether the number of errors in the received signal of the receiver B increases based on error information (operation S18). If the number of errors increases (Yes in operation S18), the detection processor 94 decides the compensation amount set for the tunable dispersion compensator 72 of the receiver B to be abnormal and outputs the previous value of the dispersion compensation control amount (operation S19). This sets the previous compensation amount for the tunable dispersion compensator 72. Then, the operation of the detection processor 94 ends. On the other hand, if the number of errors does not increase (No in operation S18), the operation of the detection processor 94 ends as is.

On the other hand, if the receiver A is present in the optical receiving apparatus having the control unit 91 and loss of signals or loss of frames is detected, a signal does not normally pass through the receiver A (No in operation S12). In this case, the detection processor 94 outputs a selective control signal that causes the selector 80 of a receiver B to select the dispersion compensation block B 79 side of the receiver B (operation S20). Also when there is no receiver A in the optical receiving apparatus having the control unit 91 (No in operation S11), the detection processor 94 outputs the selective control signal that causes the selector 80 of a receiver B to select the dispersion compensation block B 79 side of the receiver B (operation S20).

This switches the selector 80 of the receiver B so that the dispersion compensation control amount output by the dispersion compensation block B 79 is output to the tunable dispersion compensator 72 of the receiver B. The compensation amount obtained from the dispersion compensation block B 79 of the receiver B is set for the tunable dispersion compensator 72 of the receiver B, and the wavelength dispersion generated when an optical signal with the wavelength $\lambda_2$ is received is compensated in the receiver B. Then, the operation of the detection processor 94 ends. The operation S15 may be omitted.

In the optical receiving apparatus 41 depicted in FIG. 5, the compensation amount is set for the tunable dispersion compensator 72 of the receiver B 43 based on the residual dispersion amount of the receiver A 42. This reduces the time until the compensation amount is set for the tunable dispersion compensator 72 as compared with the case where the compensation amount is set for the tunable dispersion compensator 72 in a conventional method. Accordingly, it is possible to reduce the time until a signal passes through when the optical receiving apparatus 41 starts operating or the time until switch between signal routes by protection control is completed.

In addition, dispersion compensation control through digital signal processing by the receiver A 42 also reduces the time until a signal passes through the receiver A 42. As a result, it is possible to further reduce the time until a signal passes when the optical receiving apparatus 41 starts operating or the time until switch between signal routes by protection control is completed.

Since the time until the compensation amount is set for the tunable dispersion compensator 72 is long when the compensation amount is set for the tunable dispersion compensator 72 using a conventional method, it is difficult to respond to the change over time of the dispersion characteristic of the receiver B 43 during operation. On the other hand, in the second embodiment, it is possible to respond to the change over time of the dispersion characteristic of the receiver B 43 even during operation.

In the optical receiving apparatus 41 depicted in FIG. 5, the receiver B 43 may obtain the dispersion compensation control amount based on error information of the receiver B 43 without using control information of the receiver A 42 and may set the compensation amount for the tunable dispersion compensator 72. Accordingly, even if a signal does not normally pass through the receiver A 42, the wavelength dispersion generated when the receiver B 43 receives an optical signal may be compensated.

In addition, in the optical receiving apparatus 41 depicted in FIG. 5, the receiver A 42 and the receiver B 43 receive an optical signal propagating a single transmission section, so that the compensation amount to be set for the tunable dispersion compensator 72 of the receiver B 43 may be obtained based on the residual dispersion amount of the receiver A 42. In addition, the receiver A 42 outputs information of the wavelength $\lambda_1$ and residual dispersion amount information to the control unit 44, so that the control unit 44 may calculate and obtain dispersion compensation control amount information for the receiver B.

Third Embodiment

Example of an Optical Receiving Apparatus

Figure 15:
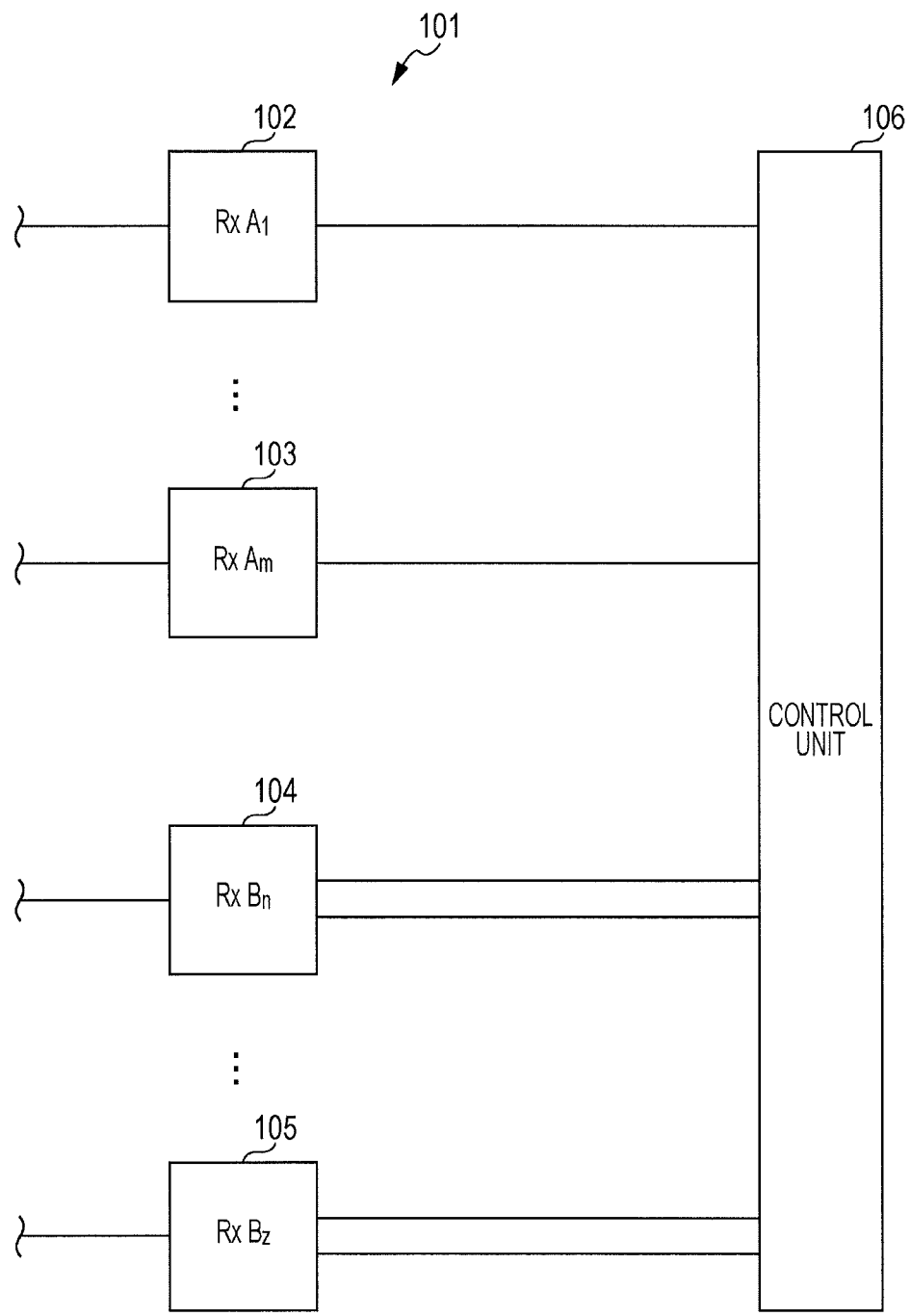
FIG. 15 depicts another example of an optical receiving apparatus according to an embodiment.
Figure 16:
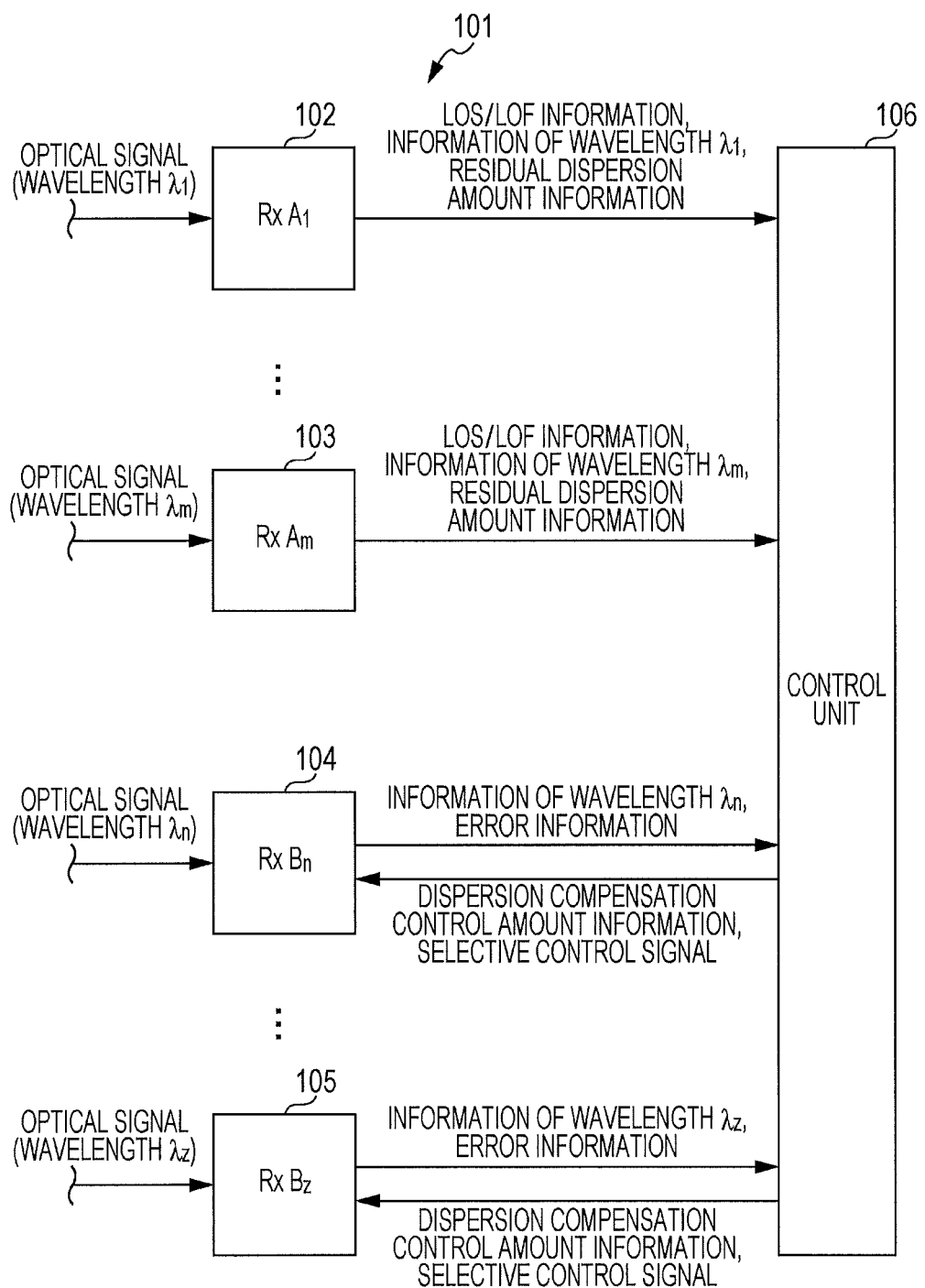
FIG. 16 depicts a signal flow in the optical receiving apparatus depicted in FIG. 15.

FIG. 15 depicts another example of an optical receiving apparatus according to an embodiment. FIG. 16 depicts a signal flow in the optical receiving apparatus depicted in FIG. 15. The optical receiving apparatus depicted in FIG. 15 is an example of the optical transmission apparatus 21 on the reception side depicted in FIG. 4.

As depicted in FIGS. 15 and 16, an optical receiving apparatus 101 includes one or more receivers A 102 and 103, one or more receivers B 104 and 105, and a control unit 106. In the third embodiment, when there are two or more receivers A and receivers B, the receivers A and receivers B are followed by a subscript as depicted in FIG. 15.

In the example depicted in FIG. 15, there are two or more receivers A and receivers B. However, the number of receivers A may be one or more than two. The number of receivers B may be one or more than two. However, when the number of receivers A is one and the number of receivers B is one, the configuration is the same as in the optical receiving apparatus 41 depicted in FIG. 5, so the number of receivers A or receivers B is two or more in the third embodiment.

A receiver $A_1$ 102 and a receiver $A_m$ 103 are examples of receivers to which information of the amount of change in the characteristic generated when an optical signal is received is output. The control unit 106 is an example of the controller. The receiver $A_1$ 102, the receiver $A_m$ 103, a receiver $B_n$ 104, and a receiver $B_z$ 105 may be connected to, for example, the demultiplexer 26 (see FIG. 4). The receiver $A_1$ 102, the receiver $A_m$ 103, the receiver $B_n$ 104, the receiver $B_z$ 105, and the control unit 106 are mutually independent cards and may be installed in the cabinet of the optical receiving apparatus 101 in a detachable manner.

The receiver $A_1$ 102 and the receiver $A_m$ 103 output information of the amount of change in the characteristic made when an optical signal is received. The description in the third embodiment assumes that the change in the characteristic made when an optical signal is received is, for example, wavelength dispersion. Accordingly, the receiver $A_1$ 102 outputs residual dispersion amount information generated when receiving an optical signal with the wavelength $\lambda_1$. The receiver $A_m$ 103 outputs residual dispersion amount information generated when receiving an optical signal with the wavelength $\lambda_m$.

An example of a receiver that outputs residual dispersion amount information is, for example, a digital coherent receiver. The description in the third embodiment assumes that the receiver $A_1$ 102 and the receiver $A_m$ 103 are, for example, digital coherent receivers.

The receiver $A_1$ 102 outputs information of the wavelength $\lambda_1$ and LOS/LOF information for reception of an optical signal with the wavelength $\lambda_1$. The receiver $A_m$ 103 outputs information of the wavelength $\lambda_m$ and LOS/LOF information for reception of an optical signal with the wavelength $\lambda_m$. An example of the receiver $A_1$ 102 and the receiver $A_m$ 103 is, for example, the digital coherent receiver 51 depicted in FIG. 7.

The receiver $B_n$ 104 and the receiver $B_z$ 105 each have a device for compensating change in the characteristic made when receiving an optical signal. If the change in the characteristic is, for example, wavelength dispersion, the device for compensating change in the characteristic may be, for example, the tunable dispersion compensator. The description in the third embodiment assumes that the receiver $B_n$ 104 and the receiver $B_z$ 105 each have a tunable dispersion compensator.

The compensation amount is set for the tunable dispersion compensator of the receiver $B_n$ 104 based on dispersion compensation control amount information supplied from the control unit 106. Based on this compensation amount, the tunable dispersion compensator of the receiver $B_n$ 104 compensates the wavelength dispersion generated when the receiver $B_n$ 104 receives an optical signal with the wavelength $\lambda_n$. The receiver $B_n$ 104 detects an error that occurs when receiving an optical signal with the wavelength $\lambda_n$ and, based on the detection result, the compensation amount may be set for the tunable dispersion compensator of the receiver $B_n$ 104.

The receiver $B_n$ 104 selects between setting the compensation amount based on dispersion compensation control amount information for the tunable dispersion compensator of the receiver $B_n$ 104 or setting the compensation amount based on error detection information, based on a selective control signal supplied from the control unit 106. In addition, the receiver $B_n$ 104 outputs information of the wavelength $\lambda_n$. The receiver $B_n$ 104 also outputs error information, which is the detection result of an error.

The compensation amount is set for the tunable dispersion compensator of the receiver $B_z$ 105 based on dispersion compensation control amount information supplied from the control unit 106. Based on this compensation amount, the tunable dispersion compensator of the receiver $B_z$ 105 compensates the wavelength dispersion generated when the receiver $B_z$ 105 receives an optical signal with the wavelength $\lambda_z$. The receiver $B_z$ 105 detects an error that occurs when receiving an optical signal with the wavelength $\lambda_z$ and, based on the detection result, the compensation amount may be set for the tunable dispersion compensator of the receiver $B_z$ 105.

The receiver $B_z$ 105 selects between setting the compensation amount based on dispersion compensation control amount information for the tunable dispersion compensator of the receiver $B_z$ 105 or setting the compensation amount based on error detection information, based on a selective control signal supplied from the control unit 106. In addition, the receiver $B_z$ 105 outputs information of the wavelength $\lambda_z$. The receiver $B_z$ 105 also outputs error information, which is the detection result of an error. An example of the receiver $B_n$ 104 and the receiver $B_z$ 105 is, for example, the receiver 71 depicted in FIG. 9.

The control unit 106 is connected to the receiver $A_1$ 102, the receiver $A_m$ 103, the receiver $B_n$ 104, and the receiver B, 105. The control unit 106 receives LOS/LOF information, residual dispersion amount information, and information of the wavelength $\lambda_1$ from the receiver $A_1$ 102 when the receiver $A_1$ 102 receives an optical signal with the wavelength $\lambda_1$. The control unit 106 receives LOS/LOF information, residual dispersion amount information, and information of the wavelength $\lambda_m$ from the receiver $A_m$ 103 when the receiver $A_m$ 103 receives an optical signal with the wavelength $\lambda_m$.

The control unit 106 receives error information and information of the wavelength $\lambda_n$ from the receiver $B_n$ 104 when the receiver $B_n$ 104 receives an optical signal with the wavelength $\lambda_n$. The control unit 106 receives error information and information of the wavelength $\lambda_z$ from the receiver $B_z$ 105 when the receiver $B_z$ 105 receives an optical signal with the wavelength $\lambda_z$.

The control unit 106 selects a receiver A through which a signal normally passes from receiver $A_1$ 102 to receiver $A_m$ 103. Based on the information of wavelength and residual dispersion amount of the selected receiver A, the control unit 106 generates dispersion compensation control amount information for each of the receiver $B_n$ 104 and the receiver $B_z$ 105. Based on LOS/LOF information from each of the receiver $B_n$ 104 and the receiver $B_z$ 105, the control unit 106 generates a selective control signal for each of the receiver $B_n$ 104 and the receiver $B_z$ 105.

Example of the Control Unit

Figure 17:
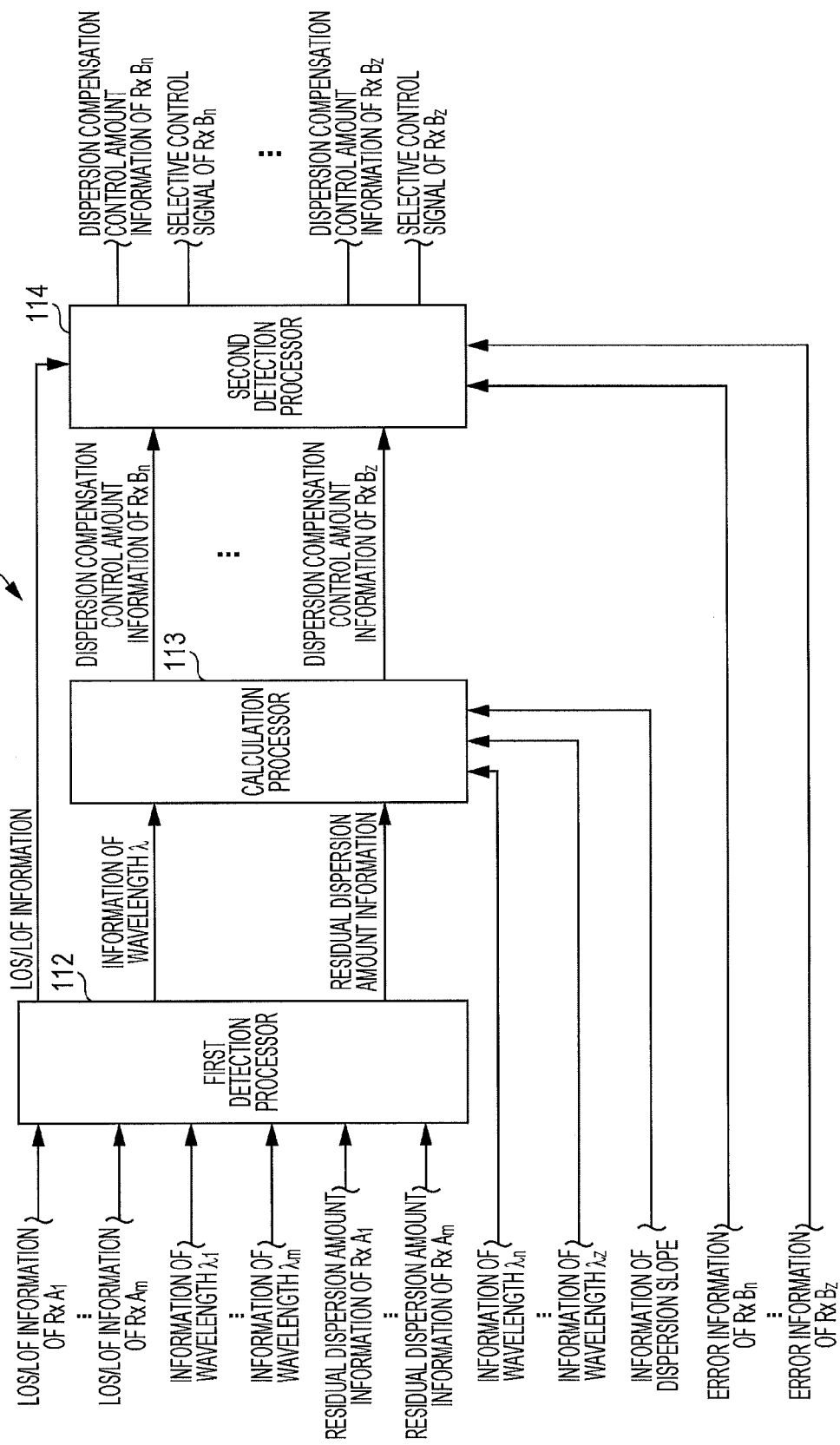
FIG. 17 depicts an example of the control unit of the optical receiving apparatus depicted in FIG. 15.

FIG. 17 depicts an example of the control unit of the optical receiving apparatus depicted in FIG. 15. As depicted in FIG. 17, a control unit 111 includes a first detection processor 112, a calculation processor 113, and a second detection processor 114. The first detection processor 112, the calculation processor 113, and the second detection processor 114 may be implemented by hardware or the processor may execute software that implements the first detection processor 112, the calculation processor 113, and the second detection processor 114.

The first detection processor 112 is connected to the controller A 63 (see FIG. 7) of, for example, the digital coherent receiver 51 of each receiver A. The first detection processor 112 receives information of the wavelength $\lambda$ of each receiver A, LOS/LOF information, and residual dispersion amount information from, for example, the controller A 63 of each receiver A. The first detection processor 112 decides whether a signal normally passes through each receiver A and, if there are one or more receivers A through which a signal normally passes, selects one of the receivers A though which a signal normally passes. The first detection processor 112 outputs information of the wavelength $\lambda$ of an optical signal received by the selected receiver A and LOS/LOF information and residual dispersion amount information generated when the selected receiver A receives an optical signal with the wavelength $\lambda$.

The calculation processor 113 is connected to the first detection processor 112 and the controller B 78 (see FIG. 9) of, for example, the receiver 71 of each receiver B. The calculation processor 113 receives the information of wavelength $\lambda$ and residual dispersion amount information of the selected receiver A from the first detection processor 112. The calculation processor 113 receives information of the wavelength $\lambda$ of an optical signal received by each receiver B from, for example, the controller B 78 of each receiver B. The calculation processor 113 performs calculation similar to that executed by the subtractor 92 and the calculation processor 93 in the control unit 91 depicted in FIG. 12 using information of the wavelength $\lambda$ and the dispersion slope $\alpha$ of each receiver B to obtain the dispersion compensation control amount of each receiver B.

The second detection processor 114 is connected to the first detection processor 112, the calculation processor 113, and the controller B 78 (see FIG. 9) of, for example, the receiver 71 among the receivers B. The second detection processor 114 receives the LOS/LOF information of the selected receiver A from the first detection processor 112. The second detection processor 114 receives information of the dispersion compensation control amount of each receiver B from the calculation processor 113. The second detection processor 114 receives error information from, for example, the controller B 78 of each receiver B.

When, for example, LOS/LOF information is normal (that is, no loss of signals or no loss of frames is detected in the LOS/LOF detection block 62 (see FIG. 7)), the second detection processor 114 updates and outputs the value of the dispersion compensation control amount of each receiver B received from the calculation processor 113. When LOS/LOF information is normal, the second detection processor 114 outputs, to the selector 80 (see FIG. 9) of each receiver B, a selective control signal that causes the selector 80 to select dispersion compensation control amount information output from the second detection processor 114.

When loss of signals or loss of frames is detected in the LOS/LOF detection block 62 (see FIG. 7), the second detection processor 114 stops updating the value of the dispersion compensation control amount received from the calculation processor 113 and outputs a fixed value to each receiver B. When loss of signals or loss of frames is detected, the second detection processor 114 outputs, to the selector 80 (see FIG. 9), a selective control signal that causes the selector 80 to select dispersion compensation control amount information output from the dispersion compensation block B 79 (see FIG. 9) of the receiver 71 among the receiver B.

When error information degrades (that is, the number of errors increases) while the second detection processor 114 updates and outputs the value of the dispersion compensation control amount of each receiver B received from the calculation processor 113, the second detection processor 114 decides that the setting of the compensation amount of the tunable dispersion compensator 72 (see FIG. 9) of each receiver B is abnormal. When the second detection processor 114 determines that the setting of the compensation amount of the tunable dispersion compensator 72 of each receiver B is abnormal, the second detection processor 114 changes the value of the dispersion compensation control amount to be output to each receiver B back to the previous value. This sets the previous compensation amount for the tunable dispersion compensator 72 of each receiver B. The previous dispersion compensation control amount may be store in a memory (not depicted) in, for example, the control unit 111.

Example of the Operation of the Control Unit

Figure 18:
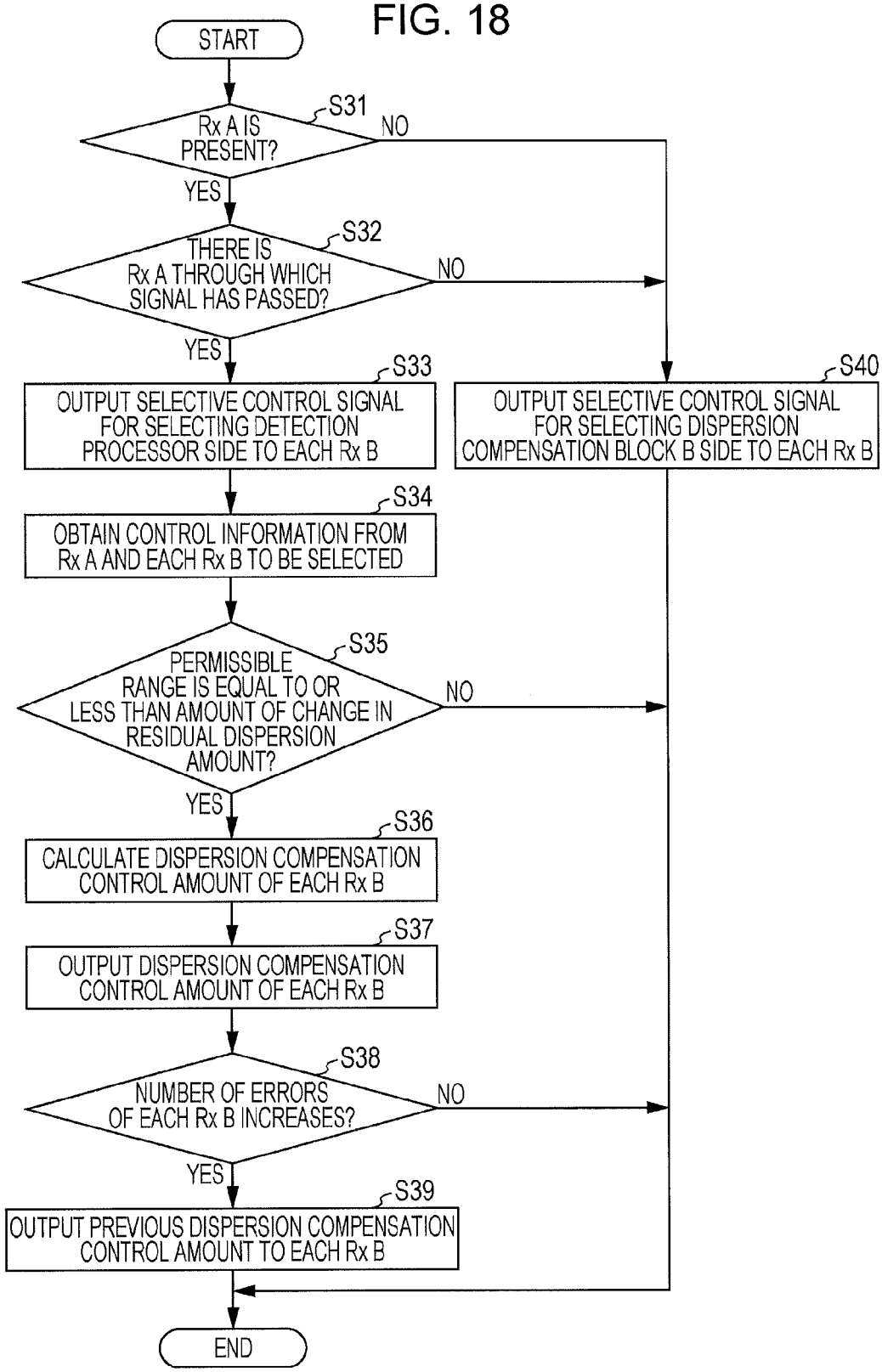
FIG. 18 is a flowchart depicting an example of the operation of the control unit depicted in FIG. 17.

FIG. 18 is a flowchart depicting an example of the operation of the control unit depicted in FIG. 17. As depicted in FIG. 18, when the control unit 111 starts operating, the control unit 111 first decides whether one or more receivers A like, for example, the digital coherent receiver 51 depicted in FIG. 7 are present in the optical receiving apparatus in which the control unit 111 is included (operation S31). When one or more receivers A are present (Yes in operation S21), the first detection processor 112 decides whether there is a receiver A through which a signal normally passes based on LOS/LOF information from each receiver A (operation S32). If a signal normally passes through a receiver A, no loss of signals or no loss of frames is detected, so LOS/LOF information is normal.

When there is a receiver A through which a signal normally passes (Yes in operation S32), the first detection processor 112 selects the receiver A through which a signal normally passes. When there are a plurality of receivers A through which a signal normally passes, the first detection processor 112 selects any one of the plurality of receivers A through which a signal normally passes. Based on the LOS/LOF information of the receiver A selected by the first detection processor 112, the second detection processor 114 outputs a selective control signal that causes the selector 80 of each receiver B like, for example, the receiver 71 depicted in FIG. 9 to select the second detection processor 114 side (operation S33). This switches the selector 80 of the receiver B so that the dispersion compensation control amount output by the second detection processor 114 is output to the tunable dispersion compensator 72.

Next, the control unit 111 obtains the control information of the receiver A and the receivers B selected by the first detection processor 112 (operation S34). For example, the calculation processor 113 obtains the information of the wavelength λ and residual dispersion amount information of the receiver A selected by the first detection processor 112, from the first detection processor 112. For example, the calculation processor 113 obtains information of the wavelengths $\lambda_n$ and $\lambda_z$ of the optical signals received by the receivers B, from the receivers B. In addition, for example, the second detection processor 114 obtains the LOS/LOF information of the receiver A selected by the first detection processor 112 from the first detection processor 112. The second detection processor 114 obtains error information from the receivers B.

Next, the calculation processor 113 decides whether the change amount obtained by comparison between the value of the residual dispersion amount obtained from the receiver A selected by the first detection processor 112 and the previous value of the residual dispersion amount is equal to or more than a permissible range (operation S35). If the change amount is less than the permissible range (No in operation S35), the control unit 111 ends the operation without calculating the dispersion compensation control amount. In this case, the compensation amount set for the tunable dispersion compensator 72 of each receiver B remains at the previous value. If the change amount is equal to or more than the permissible range (Yes in operation S35), the calculation processor 113 calculates the dispersion compensation control amount of each receiver B based on the wavelength of an optical signal received by each receiver B, the wavelength, residual dispersion amount, and dispersion slope α of the receiver A selected by the first detection processor 112 (operation S36).

Next, the second detection processor 114 receives information of the dispersion compensation control amount of each receiver B from the calculation processor 113 and outputs the information of the dispersion compensation control amount to the corresponding receiver B (operation S37). This causes the compensation amount derived from the residual dispersion amount of the receiver A selected by the first detection processor 112 to be set for the tunable dispersion compensator 72 of each receiver B and the wavelength dispersion to be compensated.

Next, the second detection processor 114 decides whether the number of errors in the received signal of each receiver B increases based on error information of each receiver B (operation S38). If the number of errors increases (Yes in operation S38), the second detection processor 114 decides the compensation amount set for the tunable dispersion compensator 72 of the receiver B in which the number of errors increases to be abnormal and outputs the previous value of the dispersion compensation control amount to the receiver B in which the number of errors increases (operation S39). This sets the previous compensation amount for the tunable dispersion compensator 72 of the receiver B in which the number of errors increases. Then, the operation of the second detection processor 114 ends. On the other hand, if the number of errors does not increase (No in operation S38), the operation of the second detection processor 114 ends as is.

On the other hand, if one or more receivers A are present in the optical receiving apparatus having the control unit 111 and loss of signals or loss of frames is detected in every receiver A, a signal does not normally pass through any receiver A (No in operation S32). In this case, the second detection processor 114 outputs, to each receiver B, a selective control signal that causes the selector 80 of each receiver B to select the dispersion compensation block B 79 side (operation S40). Also when there is no receiver A in the optical receiving apparatus having the control unit 111 (No in operation S31), the second detection processor 114 outputs, to each receiver B, a selective control signal that causes the selector 80 of each receiver B to select the dispersion compensation block B 79 side (operation S40).

This switches the selector 80 of each receiver B so that the dispersion compensation control amount output by the dispersion compensation block B 79 is output to the tunable dispersion compensator 72. The compensation amount obtained from the dispersion compensation block B 79 is set for the tunable dispersion compensator 72 in each receiver B and the wavelength dispersion is compensated in each receiver B. Then, the operation of the second detection processor 114 ends. The operation S35 may be omitted.

In the optical receiving apparatus 101 depicted in FIG. 15, even when there are two or more receivers B, the compensation amount is set for the tunable dispersion compensator 72 of each receiver B based on the residual dispersion amount of the receiver A through which a signal normally passes. This reduces the time until the compensation amount is set for the tunable dispersion compensator 72 of each receiver B as compared with the case where the compensation amount is set for the tunable dispersion compensator 72 in a conventional method. Accordingly, it is possible to reduce the time until a signal passes through when the optical receiving apparatus starts operating or the time until switch between signal routes by protection control is completed.

In the optical receiving apparatus 41 depicted in FIG. 5 or the optical receiving apparatus 101 depicted in FIG. 15, the receiver A is not limited to a digital coherent receiver and the optical receiving apparatus may be a receiver that outputs the amount of change in the characteristic made when receiving an optical signal. For example, the receiver A may be a receiver that may output residual dispersion amount information by electronic dispersion compensation (EDC).

In the optical receiving apparatus 41 depicted in FIG. 5 or the optical receiving apparatus 101 depicted in FIG. 15, the device that compensates the amount of change in the characteristic of the receiver B is not limited to the tunable dispersion compensator. An example of the device that compensates the amount of change in the characteristic is, for example, a device that compensates a polarization mode dispersion characteristic such as polarization mode dispersion compensator (PMDC). When the receiver B has a device that compensates a polarization mode dispersion characteristic, it is sufficient for the receiver A to output polarization mode dispersion information. The control for compensating polarization mode dispersion is the same as the above embodiments.

Another Example of the Optical Transmission System

Figure 19:
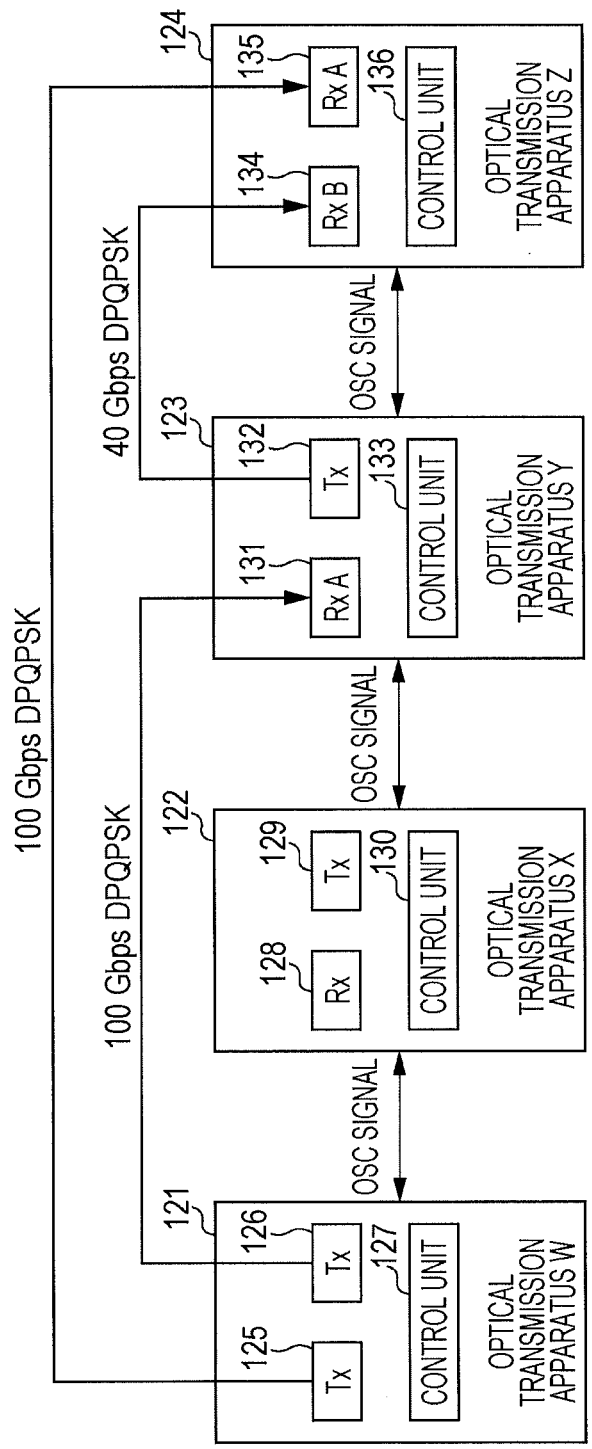
FIG. 19 depicts another example of the optical transmission system according to the embodiment.

FIG. 19 depicts another example of the optical transmission system according to the third embodiment. As depicted in FIG. 19, the optical transmission system may include, for example, an optical transmission apparatus W 121, an optical transmission apparatus X 122, an optical transmission apparatus Y 123, and an optical transmission apparatus Z 124. The optical transmission apparatus X 122 is connected to the optical transmission apparatus W 121 via an optical transmission path (not depicted) such as an optical fiber. The optical transmission apparatus Y 123 is connected to the optical transmission apparatus X 122 via an optical transmission path (not depicted) such as an optical fiber. The optical transmission apparatus Z 124 is connected to the optical transmission apparatus Y 123 via an optical transmission path (not depicted) such as an optical fiber.

The optical transmission apparatus W 121 may include, for example, transmitters 125 and 126 and a control unit 127. Both of the transmitters 125 and 126 may transmit, for example, a DPQPSK optical signal with a data transmission rate of 100 Gbps. The control unit 127 controls the transmitters 125 and 126. The optical transmission apparatus X 122 may include, for example, a receiver 128 that receives an optical signal, a transmitter 129 that transmits an optical signal, and a control unit 130 that controls the receiver 128 and the transmitter 129.

The optical transmission apparatus Y 123 may include a receiver A 131, a transmitter 132, and a control unit 133. The receiver A 131 is an example of a receiver that outputs information of the amount of change in the characteristic made when an optical signal is received and the receiver A 131 may be a digital coherent receiver that outputs, for example, residual dispersion amount information. An example of the receiver A 131 is, for example, the digital coherent receiver 51 depicted in FIG. 7. The receiver A 131 receives an optical signal transmitted from one transmitter 126 of the optical transmission apparatus W 121.

The transmitters 132 may transmit, for example, a DPQPSK optical signal with a data transmission rate of 40 Gbps. The control unit 133 controls the receiver A 131 and the transmitter 132. The control unit 133 is an example of the controller and is, for example, the control unit 91 depicted in FIG. 12 or the control unit 111 depicted in FIG. 17.

The optical transmission apparatus Z 124 may include a receiver B 134, a receiver A 135, and a control unit 136. The receiver A 135 is an example of a receiver that outputs information of the amount of change in the characteristic made when an optical signal is received and the receiver A 135 may be a digital coherent receiver that outputs, for example, residual dispersion amount information. An example of the receiver A 135 is, for example, the digital coherent receiver 51 depicted in FIG. 7. The receiver A 135 receives an optical signal transmitted from the other transmitter 125 of the optical transmission apparatus W 121.

The receiver B 134 has a device (for example, a tunable dispersion compensator) that compensates change in the characteristic made when an optical signal is received. An example of the receiver B 134 is, for example, the receiver 71 depicted in FIG. 9. The receiver B 134 receives an optical signal transmitted from the transmitter 132 of the optical transmission apparatus Y 123. The control unit 136 controls the receiver B 134 and the receiver A 135. The control unit 136 is an example of the controller and is, for example, the control unit 91 depicted in FIG. 12 or the control unit 111 depicted in FIG. 17.

The optical transmission apparatus W 121, the optical transmission apparatus X 122, the optical transmission apparatus Y 123, and the optical transmission apparatus Z 124 may exchange various types of information via an optical supervisory channel (OSC) signal. An example of information exchanged via an OSC signal among the apparatuses is, for example, information of the wavelength of an optical signal received by each optical transmission apparatus or information of the amount of change in the characteristic made when the transmission apparatus receives an optical signal.

The receiver B 134 of the optical transmission apparatus Z 124 may compensate the wavelength dispersion generated when receiving an optical signal from the transmitter 132 of the optical transmission apparatus Y 123, based on information of the wavelength and residual dispersion amount output from the receiver A 135 of the optical transmission apparatus Z 124 and the receiver A 131 of the optical transmission apparatus Y 123. Information of the wavelength and the residual dispersion amount output from the receiver A 131 of the optical transmission apparatus Y 123 is transferred to the optical transmission apparatus Z 124 via the OSC signal.

The receiver A 135 of the optical transmission apparatus Z 124 outputs information of the wavelength of an optical signal received by the receiver A 135 and information of the residual dispersion amount information generated when the receiver A 135 receives an optical signal from the transmitter 125 of the optical transmission apparatus W 121 are output. The receiver A 131 of the optical transmission apparatus Y 123 outputs information of the wavelength of an optical signal received by the receiver A 131 and information of the residual dispersion amount information generated when the receiver A 131 receives an optical signal from the transmitter 126 of the optical transmission apparatus W 121 are output.

Signal Pass Section Management Table

Figure 20:
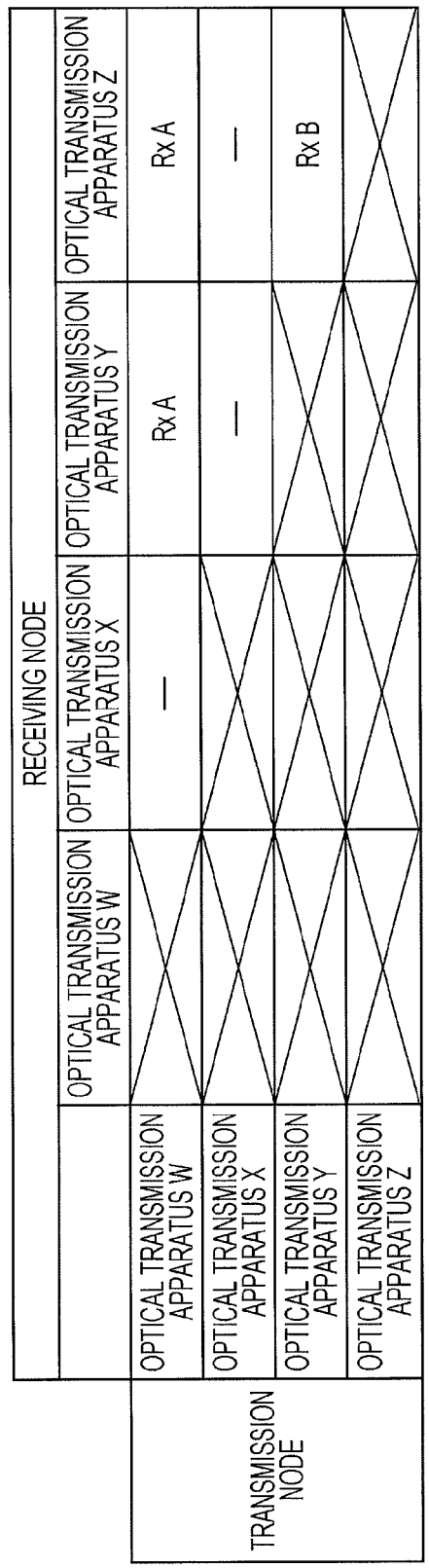
FIG. 20 depicts an example of a signal pass section table of the optical transmission system depicted in FIG. 19.

FIG. 20 depicts an example of a signal pass section table of the optical transmission system depicted in FIG. 19. In the optical transmission apparatus Z 124, the control unit 136 may create a signal pass section table 141 as depicted in FIG. 20. As depicted in FIG. 20, the signal pass section table 141 determines whether the receiver is a receiver A, which outputs information of the amount of change in the characteristic, or a receiver B, which has a device for compensating change in the characteristic, for the combination of the optical transmission apparatuses that function as the transmission node and the optical transmission apparatuses that function as the receiving node. According to the signal pass section table 141 depicted in FIG. 20, for a transmission section in which, for example, the optical transmission apparatus W 121 functions as the transmission node and the optical transmission apparatus Y 123 functions as the receiving node, the receiver is a receiver A.

Example of the Operation of the Control Unit

Figure 21:
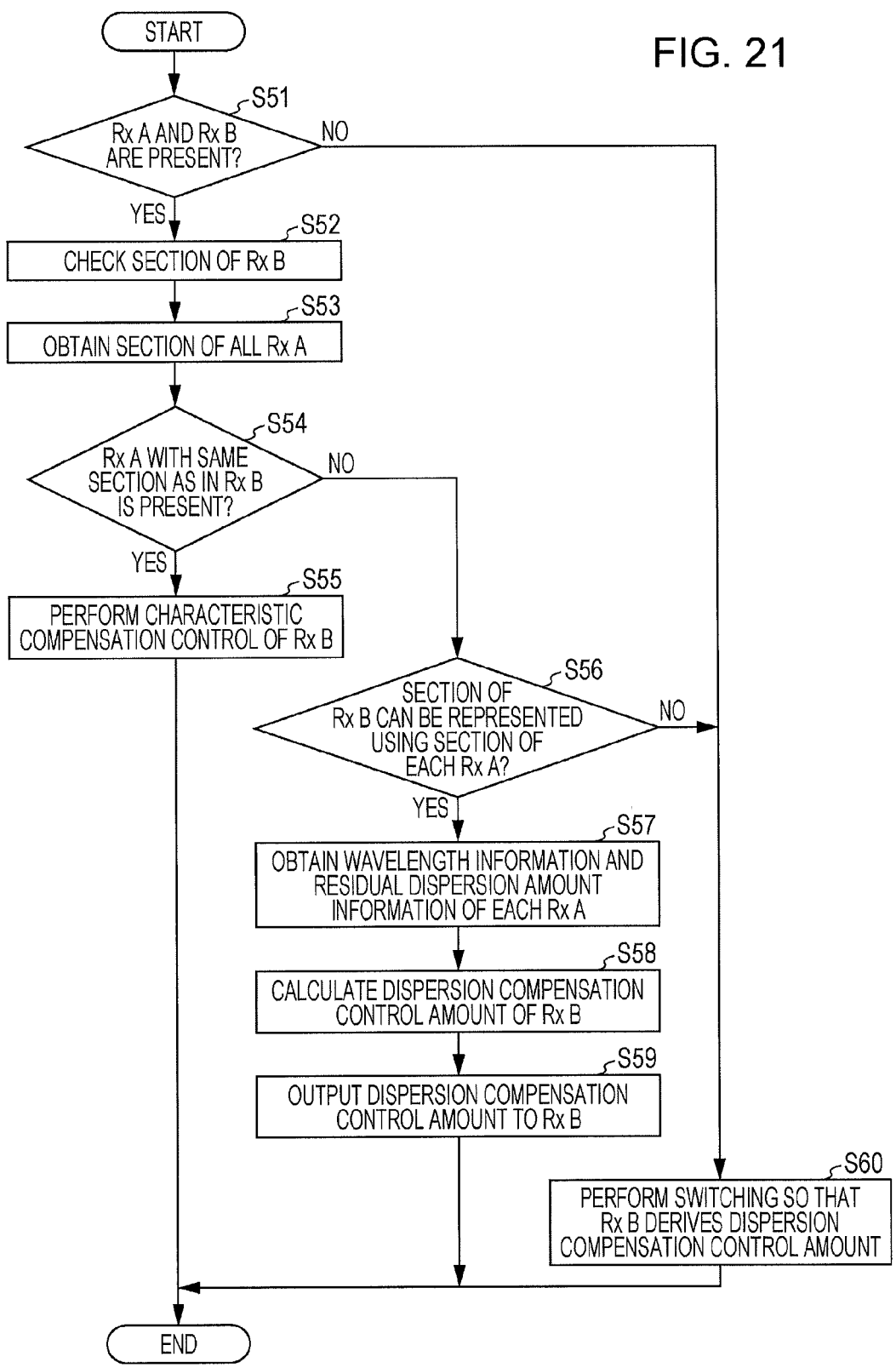
FIG. 21 depicts an example of the operation of a control unit of an optical transmission apparatus Z depicted in FIG. 19.

FIG. 21 depicts an example of the operation of the control unit of the optical transmission apparatus Z depicted in FIG. 19. As depicted in FIG. 21, when the control unit 136 of the optical transmission apparatus Z 124 starts operating, the control unit 136 first decides whether a receiver A and a receiver B are present in the optical transmission apparatus Z 124 in which the control unit 136 is included (operation S51). The receiver A is treated as a receiver that outputs information of the amount of change in the characteristic. The receiver B is treated as a receiver that has a device for compensating change in the characteristic.

When the receiver A 135 and the receiver B 134 are present (Yes in operation S51), the control unit 136 checks the signal pass section of the receiver B 134 using information transferred by the OSC signal transmitted from the upstream optical transmission apparatus Y 123 (operation S52). In the example depicted in FIG. 19, the signal pass section of the receiver B 134 ranges from the optical transmission apparatus Y 123 to the optical transmission apparatus Z 124.

Next, the control unit 136 obtains the signal pass sections of all receivers A on the upstream side including the optical transmission apparatus Z 124 in which the control unit 136 is included, using information transferred by the OSC signal (operation S53). In the example depicted in FIG. 19, the signal pass sections of the receivers A are the section ranging from the optical transmission apparatus W 121 to the optical transmission apparatus Z 124 and the section ranging from the optical transmission apparatus W 121 to the optical transmission apparatus Y 123. Operation S53 may be executed before operation S52. The control unit 136 may create, for example, the signal pass section table 141 depicted in FIG. 20.

Next, the control unit 136 decides whether there is a receiver A that has the same signal pass section as the signal pass section of the receiver B 134 checked in operation S52, of the signal pass sections of all receivers A obtained in operation S53 based on, for example, the signal pass section table 141 (operation S54). If there is a receiver A that has the same signal pass section as the signal pass section of the receiver B 134 (Yes in operation S54), the control unit 136 performs characteristic compensation control of the receiver B 134 following, for example, the flowchart depicted in FIG. 14 or FIG. 18 (operation S55) and finishes the operation.

If there is no receiver A that has the same signal pass section as the signal pass section of the receiver B 134 (No in operation S54), the control unit 136 decides whether the signal pass section of the receiver B 134 checked in operation S52 may be represented by the signal pass section of each receiver A obtained in operation S53 (operation S56). In the example depicted in FIG. 19, the signal pass section of the receiver A 135 of the optical transmission apparatus Z 124 ranges from the optical transmission apparatus W 121 to the optical transmission apparatus Z 124 and the signal pass section of the receiver A 131 of the optical transmission apparatus Y 123 ranges from the optical transmission apparatus W 121 to the optical transmission apparatus Y 123.

Accordingly, the difference between the signal pass section of the receiver A 135 of the optical transmission apparatus Z 124 and the signal pass section of the receiver A 131 of the optical transmission apparatus Y 123 is the same as the signal pass section of the receiver B 134 of the optical transmission apparatus Z 124. That is, the signal pass section of the receiver B 134 is represented by the difference between the signal pass section of the receiver A 135 and the signal pass section of the receiver A 131.

In some cases, which are not depicted, the signal pass section of the receiver B ranges from the optical transmission apparatus W 121 to the optical transmission apparatus Z 124 and the signal pass section of the receiver A ranges from the optical transmission apparatus W 121 to the optical transmission apparatus X 122 and from the optical transmission apparatus X 122 to the optical transmission apparatus Z 124. In such cases, the signal pass section of the receiver B is represented by the sum of the signal pass sections of the two receivers A.

When the signal pass section of the receiver B 134 may be represented by the signal pass sections of receivers A (Yes in operation S56), the control unit 136 obtains information of the wavelengths and the residual dispersion amounts of the receivers A used to represent the signal pass section of the receiver B 134 (operation S57). Information of the wavelengths and the residual dispersion amounts of the receivers A is included in information transferred by the OSC signal. If the result of operation S56 is No, operation S60 is executed.

Next, the control unit 136 calculates and obtains the dispersion compensation control amount of the receiver B 134 based on information of the wavelength and residual dispersion amount of each receiver A used to represent the signal pass section of the receiver B 134, information of the wavelength of an optical signal received by the receiver B 134, and information of the dispersion slope α (operation S58). In the example depicted in FIG. 19, the dispersion compensation control amounts with respect to the signal pass sections of the optical transmission apparatuses W 121 to Z 124 are obtained based on information of the wavelength and residual dispersion amount of an optical signal received by the receiver A 135 of the optical transmission apparatus Z 124, the wavelength of an optical signal received by the receiver B 134, and the dispersion slope α.

In addition, the dispersion compensation control amounts with respect to the signal pass sections of the optical transmission apparatuses W 121 to Y 123 are obtained based on information of the wavelength and residual dispersion amount of an optical signal received by the receiver A 131 of the optical transmission apparatus Y 123, the wavelength of an optical signal received by the receiver B 134, and the dispersion slope α. The dispersion compensation control amounts with respect to the signal pass sections of the optical transmission apparatuses W 121 to Y 123 is subtracted from the dispersion compensation control amounts with respect to the signal pass sections of the optical transmission apparatuses W 121 to Z 124, so that the dispersion compensation control amounts with respect to the signal pass sections of the optical transmission apparatuses Y 123 to Z 124 may be obtained.

Next the control unit 136 outputs information of the dispersion compensation control amounts with respect to the signal pass sections of the optical transmission apparatuses Y 123 to Z 124 to the receiver B134 (operation S59). This sets the compensation amount for the tunable dispersion compensator of the receiver B 134 and compensates the wavelength dispersion generated when the receiver B 134 receives an optical signal from the transmitter 132 of the optical transmission apparatus Y 123. Then, the operation of the control unit 136 ends.

On the other hand, when no receiver A is present in the optical transmission apparatus Z 124 (No in operation S51), the control unit 136 performs switching so that the receiver B 134 derives the dispersion compensation control amount (operation S60). The receiver B 134 obtains the dispersion compensation control amount that gives the minimum number of occurrences of an error while, for example, changing the compensation amount little by little over the entire control range of the tunable dispersion compensator. This sets the compensation amount for the tunable dispersion compensator of the receiver B 134 and compensates the wavelength dispersion generated when the receiver B 134 receives an optical signal from the transmitter 132 of the optical transmission apparatus Y 123. Then, the operation of the control unit 136 ends.

As depicted in, for example, operation S18 and operation S19 in the flowchart in FIG. 14, when the number of errors in the received signal of the receiver B 134 increases, the dispersion compensation control amount may be changed to the previous value.

In the optical transmission system depicted in FIG. 19, the signal pass section of the receiver B 134 of the optical transmission apparatus Z 124 may be represented by the sum and subtraction of the signal pass sections of a plurality of receivers A. In such a case, the compensation amount is set for the tunable dispersion compensator of the receiver B 134 by the sum or subtraction of the residual dispersion amounts of receivers A used to represent the signal pass section of the receiver B 134. This reduces the time until the compensation amount is set for the tunable dispersion compensator of the receiver B 134 as compared with the case where the compensation amount is set for the tunable dispersion compensator in a conventional method. Accordingly, it is possible to reduce the time until a signal passes through when the optical receiving apparatus starts operating or the time until switch between signal routes by protection control is completed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiving apparatus comprising:
a controller configured to obtain, based on a first amount of change in a characteristic with respect to a first optical signal with a first wavelength, the first wavelength, and a wavelength characteristic in the characteristic, a second amount of change in the characteristic made when a second optical signal with a second wavelength is propagated in an optical path, the second wavelength being different from the first wavelength, and to obtain a compensation amount based on the second amount of change;
a compensator configured to compensate an amount of change in the characteristic in the second optical signal; and
a first setting unit configured to, in accordance with the compensation amount obtained by the controller, set the amount of change in the characteristic in the second optical signal compensated by the compensator.

2. The optical receiving apparatus according to claim 1, wherein the first amount of change and the second amount of change are amounts of change in the characteristic with respect to the first and second optical signals propagated in the optical path.

3. The optical receiving apparatus according to claim 1, further comprising:
a receiver configured to receive the first optical signal and supply information about the first wavelength and the first amount of change to the controller.

4. The optical receiving apparatus according to claim 3, wherein the receiver obtains the second amount of change in the characteristic through digital signal processing and compensates the amount of change in the characteristic.

5. The optical receiving apparatus according to claim 1, wherein,
when a second optical path in which the second optical signal is propagated is represented by addition or subtraction of a first optical path in which the first optical signal is propagated and a third optical path in which a third optical signal with a third wavelength is propagated, the third wavelength being different from the second wavelength, the controller
obtains a third amount of change in the characteristic made when the second optical signal propagates in the first optical path, based on the first amount of change in the characteristic made when the first optical signal propagates in the first transmission section, the first wavelength, and the wavelength characteristic in the characteristic,
obtains a fourth amount of change in the characteristic made when the second optical signal propagates in the third optical path, based on the third amount of change in the characteristic made when the third optical signal propagates in the third optical path, the third wavelength, and the wavelength characteristic in the characteristic, and
obtains the second amount of change in the characteristic made when the second optical signal that propagates in the second optical path is received, based on addition or subtraction of the third amount of change and the fourth amount of change.

6. The optical receiving apparatus according to claim 1, further comprising:
a detector configured to detect an error in the second optical signal;
a second setting unit configured to monitor change in the error while changing the compensation amount of the compensator, obtain a fifth amount of change in the characteristic made when the second optical signal is received, based on a result of monitoring the error, and set the compensation amount for compensator based on the fifth amount of change; and a selector configured to select either the setting of the compensation amount by the first setting unit or the setting of the compensation amount by the second setting unit, based on the result of monitoring the error.

7. The optical receiving apparatus according to claim 1, wherein the amount of change in the characteristic is a wavelength dispersion amount.

8. The optical receiving apparatus according to claim 1, wherein the first and second optical signals propagate together through the optical path as a wavelength division multiplexed light, and are thereafter demultiplexed, and the compensator compensates the amount of change in the characteristic in the second optical signal after having been demultiplexed.

9. A characteristic compensation method comprising:

obtaining, based on a first amount of change in the characteristic with respect to a first optical signal, the first wavelength, and a wavelength characteristic in the characteristic, a second amount of change in the characteristic made when a second optical signal with a second wavelength is propagated in an optical path, the second wavelength being different from a first wavelength, obtaining a compensation amount for compensating the second amount of change based on the second amount of change, and setting the compensation amount for a compensator that compensates, in the second optical signal, the second amount of change in the characteristic made-when the second optical signal is received.

10. The characteristic compensation method according to claim 9, wherein the first amount of change and the second amount of change are amounts of change in the characteristic with respect to the first and second optical signals propagated in the optical path.

11. The characteristic compensation method according to claim 9, wherein when a second optical path in which the second optical signal is represented by addition or subtraction of a first optical path in which the first optical signal and a third optical path in which a third optical signal with a third wavelength is propagated, the third wavelength being different from the second wavelength, obtaining a third amount of change in the characteristic made when the second optical signal propagates in the first optical path, based on the first amount of change in the characteristic made when the first optical signal propagates in the first optical path, the first wavelength, and the wavelength characteristic in the characteristic, obtaining a fourth amount of change in the characteristic made when the second optical signal propagates in the third optical path, based on the third amount of change in the characteristic made when the third optical signal propagates in the third optical path, the third wavelength, and the wavelength characteristic in the characteristic, and obtaining the second amount of change in the characteristic made when the second optical signal that propagates in the second optical path is received, based on addition or subtraction of the third amount of change and the fourth amount of change.

12. The characteristic compensation method according to claim 9, wherein the first and second optical signals propogate together through the optical path as a wavelength division multiplexed light, and are thereafter demultiplexed, and the compensator compensates the second amount of change in the characteristic in the second optical signal after having been demultiplexed.

13. An apparatus comprising:

a controller configured to receive information indicating a first wavelength, a second wavelength, an amount of residual dispersion with respect to a first optical signal having the first wavelength and which propagated in an optical path, and a dispersion slope of the optical path, and configured to, based on the received information, determine a residual dispersion of a second optical signal having the second wavelength propagated in an optical path; and a dispersion compensator to compensate for dispersion in the second optical signal by a dispersion compensation amount, wherein the controller sets the dispersion compensation amount of the dispersion compensator based on the determined residual dispersion.

14. The apparatus according to claim 13, wherein the first and second optical signals propagate together through the optical path as a wavelength division multiplexed light, and are thereafter demultiplexed, and the dispersion compensator compensates for dispersion in the second optical signal after having been demultiplexed.

* * * * *

UNITED STATES PATENT AND TRADEMARK OFFICE
CERTIFICATE OF CORRECTION

| | | |
|---|---|---|
| PATENT NO. | : 9,071,354 B2 | Page 1 of 1 |
| APPLICATION NO. | : 13/920382 | |
| DATED | : June 30, 2015 | |
| INVENTOR(S) | : Hiroshi Iizuka | |

It is certified that error appears in the above-identified patent and that said Letters Patent is hereby corrected as shown below:

On the Title Page, Item (72) Inventors, Line 1

Delete "Kasawaki" and insert --Kawasaki--, therefor.

In the Claims

Claim 9, Column 25, Line 34

Delete "made-when" and insert --when--, therefor.

Claim 12, Column 26, Line 20

Delete "propogate" and insert --propagate--, therefor.

Signed and Sealed this
Thirteenth Day of October, 2015

Michelle K. Lee
*Director of the United States Patent and Trademark Office*